(12) United States Patent
Stokes et al.

(10) Patent No.: US 8,492,491 B2
(45) Date of Patent: Jul. 23, 2013

(54) METHODS FOR PRODUCING TELECHELIC POLYOLEFINS FROM TERPENE INITIATORS

(75) Inventors: Casey D. Stokes, Novato, CA (US); Young A. Chang, Richmond, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 203 days.

(21) Appl. No.: 12/813,411

(22) Filed: Jun. 10, 2010

(65) Prior Publication Data

US 2011/0306738 A1     Dec. 15, 2011

(51) Int. Cl.
*C08F 4/52* (2006.01)
*C08F 4/609* (2006.01)

(52) U.S. Cl.
USPC ............ 526/89; 526/206; 526/210; 526/217; 526/346; 526/347; 526/348.7; 528/396; 528/397; 528/491

(58) Field of Classification Search
USPC ................... 526/89, 206, 210, 217, 346, 347, 526/348.7; 528/396, 397, 491
See application file for complete search history.

(56) References Cited

U.S. PATENT DOCUMENTS

| | | | |
|---|---|---|---|
| 3,155,686 A | 11/1964 | Prill et al. | |
| 3,632,600 A | 1/1972 | Morris et al. | |
| 4,034,038 A | 7/1977 | Vogel | |
| 4,152,499 A | 5/1979 | Boerzel et al. | |
| 4,238,628 A | 12/1980 | Cahill et al. | |
| 4,255,538 A | 3/1981 | Skillcorn | |
| 4,276,394 A | 6/1981 | Kennedy et al. | |
| 4,342,849 A | 8/1982 | Kennedy | |
| 4,393,199 A | 7/1983 | Manser | |
| 4,429,099 A | 1/1984 | Kennedy et al. | |
| 4,468,291 A | 8/1984 | Naarmann et al. | |
| 4,486,572 A | 12/1984 | Kennedy | |
| 4,568,732 A | 2/1986 | Kennedy et al. | |
| 4,758,631 A | 7/1988 | Kennedy et al. | |
| 4,814,405 A | 3/1989 | Kennedy | |
| 4,910,321 A | 3/1990 | Kennedy et al. | |
| 4,929,683 A | 5/1990 | Kennedy et al. | |
| 4,943,616 A | 7/1990 | Mishra et al. | |
| 4,946,899 A | 8/1990 | Kennedy et al. | |
| 4,948,936 A | 8/1990 | Landry | |
| 5,032,653 A | 7/1991 | Cheradame et al. | |
| 5,066,730 A | 11/1991 | Kennedy et al. | |
| 5,112,507 A | 5/1992 | Harrison | |
| 5,122,572 A | 6/1992 | Kennedy et al. | |
| 5,169,914 A | 12/1992 | Kaszas et al. | |
| 5,175,225 A | 12/1992 | Ruhe, Jr. | |
| 5,219,948 A | 6/1993 | Storey et al. | |
| 5,225,492 A | 7/1993 | Kennedy et al. | |
| 5,286,823 A | 2/1994 | Rath | |
| 5,300,701 A | 4/1994 | Cherpeck | |
| 5,334,321 A | 8/1994 | Harrison et al. | |
| 5,336,745 A | 8/1994 | Cheradame et al. | |
| 5,340,881 A | 8/1994 | Kennedy et al. | |
| 5,350,786 A | 9/1994 | Costanzi et al. | |
| 5,350,819 A | 9/1994 | Shaffer | |
| 5,366,745 A | 11/1994 | Daden | |
| 5,395,885 A | 3/1995 | Kennedy et al. | |
| 5,428,111 A | 6/1995 | Faust et al. | |
| 5,444,135 A | 8/1995 | Cheradame et al. | |
| 5,448,000 A | 9/1995 | Gullapalli et al. | |
| 5,451,647 A | 9/1995 | Faust et al. | |
| 5,464,549 A | 11/1995 | Sieberth | |
| 5,506,316 A | 4/1996 | Shaffer | |
| 5,580,935 A | 12/1996 | Shaffer | |
| 5,616,668 A | 4/1997 | Harrison et al. | |
| 5,629,394 A | 5/1997 | Cheradame et al. | |
| 5,637,647 A | 6/1997 | Faust et al. | |
| 5,663,457 A | 9/1997 | Kolp | |
| 5,663,470 A | 9/1997 | Chen et al. | |
| 5,677,386 A * | 10/1997 | Faust ........................... 525/289 |
| 5,690,861 A | 11/1997 | Faust | |
| 5,777,044 A | 7/1998 | Faust | |
| 5,945,491 A | 8/1999 | Matyjaszewski et al. | |
| 5,948,936 A | 9/1999 | Itoh et al. | |
| 6,033,446 A | 3/2000 | Cherpeck et al. | |
| 6,121,379 A | 9/2000 | Yamanaka et al. | |
| 6,194,597 B1 | 2/2001 | Faust et al. | |
| 6,407,066 B1 | 6/2002 | Dressen et al. | |
| 6,451,920 B1 | 9/2002 | Harrison et al. | |
| 6,468,948 B1 | 10/2002 | Rossi et al. | |
| 6,515,083 B2 | 2/2003 | Ozawa et al. | |
| 6,642,318 B1 | 11/2003 | Chiefari et al. | |
| 6,753,391 B1 | 6/2004 | Lewandowski et al. | |
| 6,818,716 B2 | 11/2004 | Wendland et al. | |

(Continued)

FOREIGN PATENT DOCUMENTS

| | | |
|---|---|---|
| DD | 237072 | 7/1986 |
| DD | 240308 | 10/1986 |
| DD | 253827 | 2/1988 |
| DD | 262028 | 11/1988 |
| DD | 262233 | 11/1988 |
| DD | 266104 | 3/1989 |
| DD | 282697 | 9/1990 |
| DD | 296283 | 11/1991 |
| DD | 296284 | 11/1991 |
| DD | 296285 | 11/1991 |
| DD | 296286 | 11/1991 |
| EP | 206756 | 12/1986 |

(Continued)

OTHER PUBLICATIONS

Puskas, J. E Brister, L. B., Michel, A. J., Lanzendorfer, M. G., Jamieson, D., and Pattern, W. G., "Novel Substituted Epoxide Initiators for the Carbocationic Polymerization of Isobutylene", J. Polym. Sci. Part A 2000, 38(3), 444-452.*

(Continued)

*Primary Examiner* — Richard A Huhn
(74) *Attorney, Agent, or Firm* — Jones Day

(57) ABSTRACT

Provided herein are methods for the preparation of telechelic polyolefins via polymerization reaction with a terpene initiator.

47 Claims, No Drawings

U.S. PATENT DOCUMENTS

| | | | |
|---|---|---|---|
| 6,906,011 | B2 | 6/2005 | Harrison et al. |
| 6,969,744 | B2 | 11/2005 | Stokes et al. |
| 7,071,275 | B2 | 7/2006 | Rath et al. |
| 7,124,110 | B1 | 10/2006 | Kemp, II et al. |
| 7,244,870 | B2 | 7/2007 | Lange et al. |
| 7,420,019 | B2 | 9/2008 | Stokes |
| 7,501,476 | B2 | 3/2009 | Stokes |
| 7,576,161 | B2 | 8/2009 | Stokes |
| 7,705,090 | B2 | 4/2010 | Stokes |
| 7,709,580 | B2 | 5/2010 | Stokes |
| 7,816,459 | B2 | 10/2010 | Stokes |
| 8,013,073 | B2 | 9/2011 | Stokes et al. |
| 8,063,154 | B2 | 11/2011 | Storey et al. |
| 8,133,954 | B2 | 3/2012 | Stokes |
| 8,383,736 | B2 | 2/2013 | Stokes et al. |
| 8,383,760 | B2 | 2/2013 | Stokes |
| 2002/0082367 | A1 | 6/2002 | McConville et al. |
| 2002/0132905 | A1 | 9/2002 | Babinee et al. |
| 2003/0105194 | A1 | 6/2003 | Suart et al. |
| 2003/0162858 | A1 | 8/2003 | Faust et al. |
| 2003/0191257 | A1 | 10/2003 | Wettling et al. |
| 2004/0015029 | A1* | 1/2004 | Lange et al. ............ 585/521 |
| 2004/0260033 | A1 | 12/2004 | Stokes et al. |
| 2005/0282972 | A1 | 12/2005 | Stokes et al. |
| 2006/0041081 | A1 | 2/2006 | Stokes et al. |
| 2006/0041083 | A1 | 2/2006 | Stokes et al. |
| 2006/0041084 | A1* | 2/2006 | Stokes et al. ............ 525/375 |
| 2006/0135721 | A1 | 6/2006 | Lange et al. |
| 2006/0142503 | A1* | 6/2006 | Lang et al. ............ 525/333.7 |
| 2006/0264577 | A1 | 11/2006 | Faust et al. |
| 2007/0155908 | A1 | 7/2007 | Stokes et al. |
| 2007/0155910 | A1 | 7/2007 | Stokes |
| 2007/0155911 | A1 | 7/2007 | Stokes et al. |
| 2009/0247716 | A1 | 10/2009 | Stokes et al. |
| 2009/0258803 | A1 | 10/2009 | Harrison et al. |
| 2010/0184918 | A1 | 7/2010 | Storey et al. |
| 2010/0249001 | A1 | 9/2010 | Storey et al. |
| 2011/0028681 | A1 | 2/2011 | Storey et al. |
| 2011/0306738 | A1 | 12/2011 | Stokes et al. |
| 2011/0306745 | A1 | 12/2011 | Storey et al. |
| 2013/0012662 | A1 | 1/2013 | Stokes et al. |

FOREIGN PATENT DOCUMENTS

| | | |
|---|---|---|
| EP | 255181 | 2/1988 |
| EP | 342792 | 11/1989 |
| EP | 0397081 | 5/1990 |
| EP | 400844 | 5/1990 |
| EP | 341012 | 12/1992 |
| EP | 959096 | 11/1999 |
| EP | 1209170 | 5/2002 |
| EP | 1489109 | 12/2004 |
| GB | 1159368 | 4/1987 |
| GB | 2184738 | 7/1987 |
| JP | 03287605 | 12/1991 |
| JP | 4-020501 | 1/1992 |
| JP | 5-186513 | 7/1993 |
| JP | 2001172567 A | 6/2001 |
| SU | 293804 | 1/1971 |
| WO | 90/05711 | 5/1990 |
| WO | 94/13706 | 6/1994 |
| WO | 97/19962 | 6/1997 |
| WO | 99/09074 | 2/1999 |
| WO | 00/75202 | 12/2000 |
| WO | 03/106390 | 12/2003 |
| WO | 2004/048215 | 6/2004 |
| WO | 2006/110647 | 10/2006 |

OTHER PUBLICATIONS

International Search Report for application PCT/US2011/037383, mailing date Jan. 19, 2012.*

Bae et al., "B-Proton Elimination by Free Bases in the Living Carbocationic Polymerization of Isobutylene," Macromolecules 30:7341-7344 (1997).

Bae et al., "The Role of Pyridine Derivatives in Living Carbocationic Polymerization: Lewis Base or Nucleophile," Macromol. Symp. 132:11-23 (1998).

Bauer et al., "Cationic Polymerication of isobutene Initiated by Stannic Chloride and Phenols: Polymer Endgroup Studies," J. Poly. Sci. Part A-1 9:1451-1458 (1971).

Bauer et al., "Complexes of Stannic Chloride and Alkyl Phenols and the Influence of These Complexes and of Free Phenol on the Cationic Polymerization of Isobutene," Can. J. Chem. 48:1251-1262 (1970).

Bezumnova et al., "Reaction of 2-Mercaptobenzothiazole with Ethylenic Hydrocarbons" Khim. Geterosikl. Soedin. 80:194-196 (1971) (English abstract).

Campa et al., "Addition Des Thiols Sur Les Double Liaisons Des Polybutadienes Hydroxytelecheliques Radicalaire et Anionique. Etude Des Mecanismes D'Addition par $^1$H et $^{13}$C NMR," Makromol. Chem. 182:1415-1428 (1981).

Cheng et al., "Study of the Interactions of Organic Sulfides with Active Species in the Cationic Polymerization of 1,3-Pentadiene," Polymer Bulletin 51:343-349 (2004).

Boileau et al., "Reaction of Functionalised Thiols with Oligoisobutenes via Free-Radical Addition. Some New Routes to Thermoplastic Crosslinkable Polymers," European Polymer Journal 39:1395-1404 (2003).

Chang et al., "Initiation of Quasiliving Isobutylene Polymerization via Terpenoid Derivatives," Poster, 2011 International Symposium on Ionic Polymerization, Jul. 10-15, 2011 in Akron, Ohio.

Cirpan et al., "Synthesis and Electroactivity of Pyrrole End-Functionalized Poly(2-Methyl-2-Oxazoline)," European Polymer Journal 37:2225-2229 (2001).

De et al., "Capping Reactions in Cationic Polymerization: Kinetic and Synthetic Utility," Polymer Reprints 46:847-848 (2005).

De et al., "Carbocationic Polymerization of Isobutylene Using Methylaluminum Bromide Coinitiators: Synthesis of Bromoallyl Functional Polyisobutylene," Macromolecules 39:7527-7533 (2006).

De et al., "Relative Reactivity of C4 Olefins Toward the Polyisobutylene Cation," Macromolecules 39:6861-6870 (2006).

DePuy et al., "Electronic Effects in Elimination Reactions, V. The E2 Reaction of b-Phenylethyl Fluorides and Chlorides," J. Am. Chem. Soc. 82:2535-3537 (1960).

Diaz et al., "A Polymer Electrode with Variable Conductivity: polypyrrole," J.C.S. Chem. Comm. 397-398 (1980).

Diaz et al., "Electrochemical Polymerization of Pyrrole," J.C.S. Chem. Comm. 635-636 (1979).

Evsyukov et al., "Chemical Dehydrohalogenation of Halogen-Containing Polymer," Russian Chemical Reviews 60:373-390 (1991).

Faust et al., "Living Carbocationic Polymerization. XXI. Kinetic and Mechanistic Studies of Isobutylene Polymerization Initiated by Trimethylpentyl Esters of Different Acids", J. Macromol. Sci. -Chem. A27:649-667 (1990).

Faust et al., "Living Carbocationic Polymerization. IV. Living Polymerization of Isobutylene", J. Polym. Sci. A Polym. Chem. 25:1847-1869 (1987).

Feldthusen et al., "The Effect of Reaction Conditions on the Chain End Structure and Functionality During Dehydrochlorination of tert-Chlorine-Telechelic Polyisobutylene by Potassium tert-Butoxide," Macromol. Rapid Comm. 19:661-663 (1998).

Fodor et al., "Synthetic Applications of Non-Polymerizable Monomers in Living Carbocationic Polymerizations," Polymer Reprints 35:492-493 (1994).

Gardini, "The Oxidation of Monocyclic Pyrroles," Adv. Heterocyl. Chem. 15:67-99 (1973).

De La Campa et al., "Addition des thiols sur les double liaisons des polybutadienes hydroxytelecheliques radicalaire et anionique. Etude des mecanismes d'addition par $^1$H et $^{13}$C NMR," Makromol. Chem. 182:1415-1428 (1981) (English Abstract).

Gorski et al., "Functionalized Polyisobutenes by SH-en AdditionM," Die Angewandte Makromolekulare Chemie 253:51-64 (1997).

Hadjikyriacou et al., "Cationic Macromolecular Design and Synthesis Using Furan Derivatives," Macromolecules 32:6393-6399 (1999).

Hadjikyriacou et al., "Living Coupling Reaction in Living Cationic Polymerization. 3. Coupling Reaction of Living Polyisobutylene Using Bis(furanyl) Derivatives," Macromolecules 33:730-733 (2000).

Hadjikyriacou et al., "Living Coupling Reaction in Living Cationic Polymerization. 4. Synthesis of Telechelic Polyisobutylenes Using Bis-Furanyl Derivatives as Coupling Agents," JMS PureApplChem A37:1333-52 (2000).

Hamley, "Block Copolymers," Encyclopedia of Polymer Science and Technology 457-482 (2003).

Higashihara et al., "Synthesis of Poly(isobutylene-block-methyl methzcrylate) by a Novel Coupling Approach," Macromolecules 39:5275-5279 (2006).

Ipatieff et al., "Reaction of Aliphatic Olefins with Thiophenol," J. Am. Chem. Soc. 60:2731-2734 (1938).

Ivan et al., "Living Carbocationic Polymerization. XXX. One-Pot Synthesis of Allyl-Terminated Linwar and Tri-Arm Star Polyisobutylenes, and Epoxy-and Hydroxy-Telechelics Therefrom," J. Polym. Sci.: Part A: Polym. Chem. 28:89-104 (1990).

Ivan et al., "New Telechelic Polymers and Sequential Copolymers by Polyfunctional Initiator-Transfer Agents (Inifers)," J. Poly. Chem. Ed. 18:3177-3191 (1980).

Kaszas et al., "Electron Pair Donors in Carbocationic Polymerization. 2. Mechanism of Living Carbocationic Polymerizations and the Role of in Situ and External Electron Pair Donors," Macromolecules 23:3909-3915 (1990).

Kaszas et al., "Living Carbocationic Polymerization. Isobutylene Polymerization in the Presence of Pyridine and Various Other Electron Donors," Polymer Bulletin (Berlin) 20:413-19 (1988).

Keaton, R.J., Living Ziegler-Natta Polymerization (2002) http://www.chem.wayne.edu/acs_organic_division/essay_2002/keaton.pdf, retrieved on Oct. 22, 2003.

Keki et al., "Dimethyldioxirane as a New and Effective Oxidation Agent for the Epoxidation of α,ω-Di(isobutenyl)polyisobutylene: A Convenient Synthesis of a,w-Di(2-Methyl-3-Hydroxypropyl)-Polyisobutylene," J. Poly. Sci. A Poly. Chem. 40:3974-3986 (2002).

Kemp, Synthesis and Characterization of Novel Polyisobutylene-Based Materials: Gradient Block Copolymers, Exo-Olefins via in Situ Quenching, and Carboxylic Acid-Functional Telechelics; Thesis Dissertation, University of Southern Mississippi, 73-118 (2007).

Kennedy et al., "New Telechelic Polymers and Sequential Copolymers by Polyfunctional Initiator-Transfer Agents, (Inifers) 10. Three-Arm Star Telechelic Polyisobutylenes Carrying Chlorine, Olefin or Primary Alcohol Endgroups," Polym. Bull. 4:67-74 (1981).

Kennedy et al., "Living Carbocationic Polymerization. XXXIX. Isobutylene Polymerization in the Presence of Pyridine and Various Other Electron Donors," Journal of Macromolecular Science, Chemistry, A28:197-207 (1991).

Kennedy et al., "New Telechelic polymers and sequential Copolymers by Polyfunctional Initiator Transfer Agents (Inifers) 27 Bisphenol and Trisphenol Polyisobutylenes," Poly. Bull. 8:563-570 (1982).

Kennedy et al., "New Telechelic Polymers and Sequential Copolymers by Polyfunctional Initiator Transfer Agents (Inifers) V. Synthesis of a-tert-butyl-w-isopropenylopolyisobutylene and α,ω)-Di(isopropenyl)Polyisobutylene," Polymer Bulletin 1:575-580 (1979).

Kennedy et al., "New Telechelic Polymers and Sequential Copolymers by Polyfunctional Initiator-Transfer Agents, I.," Polym. Prepr., Am. Chem. Soc., Div. Polym. Chem. 20:316 (1979).

Kennedy et al., "New Telechelic Polymers and Sequential Copolymers by Polyfunctional Initiator-Transfer Agents, II.," J. Polym. Sci., Polym. Chem. Ed. 18:1523 (1980).

Kennedy et al., "New Telechelic Polymers and Sequential Copolymers by Polyfunctional Initiator-Transfer Agents (Inifers)," Polym. Bull. 9:27-32 (1983).

Kim et al., "Synthesis and Characterization of Novel Silicon-Functional Polyisobutylenes and Their Applications: Polyisobutylene Brushes on Silicate Substrates via Living Cationic Polymerization," Journal of Macromlecular Science Part A—Pure and Applied Chemistry A40:991-1008 (2003).

Klemm et al., "Untersuchungen zur Thioladdition an Polybutadiene," Angew Makromol. Chem. 207:187-193 (1993) (English Abstract).

Klemm et al., "Unusual Addition by the Thiol-ene Photopolymerization," Polym. Bull. (Berlin) 28:653-656 (1992).

Koroskenyl et al., "Initiation via Haloboration in Living Cationic Polymerization. 6. A novel Method for the Synthesis of Primary Amine Functional Polyisobutylenes," Pure Appl. Chem. A36:1879-1893 (1999).

Lenz, "Organic Chemistry of Synthetic High Polymers," Section 7.2 Poly(alkylene Sulfides), Interscience Publishers, New York, p. 196, (1967).

Li et al., "Polyisobutylene Supports—A Non-Polar Hydrocarbon Analog of PEG Supports," Tetrahedron 61:12081-12092(2005).

Lu et al., "Living Cationic Isomerization Polymerization of Beta-Pinene. 1. Initiation with HCl-2-Chloroethyl Vinyl Ether Adduct/ $TiCl_3(OiPr)$ in Conjunction with $nBu_4NCl$," Macromolecules 30:22-26 (1997).

Machl et al., "Novel Synthetic Routes to Aminofunctionalized Polyisobutylenes," ACS Div. Polym. Chem. Polym. Preprs. 44:858-859 (2003).

Maenz et al., "Comb-Like Polymers From Macromonomers Based on Low-Molecular Weight Poly(isobutene)s," Angewandte Makromolekulare Chemie 258:69-73 (1998).

Maenz et al., "Investigation of the Structure of Low Molecular Weight Polybutadienes and Epoxides Made Therefrom," Acta Polymerica 47:208-213 (1996).

Maenz et al., "Macromonomers Based on Low-Molecular-Weight Polyisobutenes," Angewandte Makromolekulare Chemie 242:183-197 (1996).

Martinez-Castro et al., "Polyisobutylene Stars and Polyisobutylene-block-poly(tert-butyl methacrylate) Block Copolymers by Site Transformation of Thiophene End-Capped Polyisobutylene Chain Ends," Macromolecules 36:6985-6994 (2003).

Martinez-Castro et al., "Primary Halide-Terminated Polyisobutylene: End-Quenching of Quasiliving Carbocationic Polymerization with N-(ω-Haloalkyl)pyrrole," Macromolecules 42:4963-4971 (Published on Web Jun. 25, 2009).

Mishra et al., "Living Carbocationic Polymerization, VIII.," J. P. Polym. Bull. 17:7-13 (1987).

Mishra et al., "New Telechelic Polymers and Sequential Copolymers by Polyfunctional Initiator Transfer Agents (Inifers) LI. Synthesis and Characterization of Anisole Terminated Polyisobutylenes," Poly. Bull. 16:47-53 (1986).

Morgan et al., "Sulfonium Ion Adducts from Quasiliving Polyisobutylene and Mono- or Disulfides," Macromolecules 42:2344-2352 (2009).

Morgan et al., "Kinetics and Mechanism of End-Quenching of Quasiliving Polyisobutylene with Sterically Hindered Bases," Macromolecules 44:2438-2443 (2011).

Morgan et al., "Thiol/Ene Photocurable Polymers," J. Polym. Sci. Polym. Chem. Ed. 15:627 (1977).

Morgan et al., "Sulfonium Ion Adducts from Quasiliving Polyisobutylene and Alkyl Mono- or Disulfides," Polymer Preprints 50:64-65 (2009).

Morgan et al., "Primary Hydroxy-Terminated Polyisobutylene via End-Quenching with a Protected N-(ω-Hydroxyalkyl)pyrrole," Macromolecules 43:1329-1340 (Published on Web Jan. 6, 2010).

Nemes et al., "A New Asymmetric-Telechelic Polyisobutylene Prepared by the cis-2-pinanol/BC13, Initiating System," Polymer Bulletin 21:293-300 (1989).

Nemes et al., "Oxyethylation and Carbonation of Telechelic Polyisobutylene Anions," Poly. Bull. 24:187-194 (1990).

Nemes et al., "Macromere by Carbocationic Polymerization," Polym. Bull. 25:633-640 (1991).

Nielsen et al., "Synthesis of Isobutenyl-Telechelic Polyisobutylene by Functionalization with Isobutenyltrimethylsilane," Polymer 38:2529-2534 (1997).

Nuyken et al., "Novel Sulfur Containing Polymers," Makromol. Chem. Macromol. Symp. 26:313 (1989).

Nuyken et al., "Telechelics via Addition of Dithiols Onto Alkadienes, 1 Radical Mechanism," Makromol. Chem. Rapid Commun. 11:365 (1990).

Nuyken et al., "New Telechelic Polymers and Sequential Copolymers by Polyfunctional Initiator-Transfer Agents (Inifers) 9. A Demonstration of Chain Extension of α,ω-Polyisobutylene-diolefins with Dithiols," Polym. Bull. 4:61-65 (1981).

Odian, Principles of Polymerization, 4th ed., Wiley, Chapter 8 (2004).

Percec et al., "New Telechelic Polymers and Sequential Copolymers by Polyfunctional Initiator-Transfer Agents (Inifers) 29. Synthesis of α,ω-di(amino)polyisobutylenes," Polymer Bulletin 9:27-32 (1983).

Pernecker et al., "Living Carbocationic Polymerization, XLVI, Living Isobutylene Polymerization Induced by the Common Ion Effect," Polym. Bull. 26:305-312 (1991).

Puskas et al., "Investigation of the Effect of Epoxide Structure on the Initiation Efficiency in Isobutylene Polymerizations Initiated by Epoxide/TiCl$_4$ Systems," Euro. Polymer Journal 39:2147-2153 (2003).

Puskas et al., "The Nature of the Double Bond in Low Molecular Weight Polyisobutylenes and Polybutene Copolymers," J. Polymer Sci: Symposium 56:191-202 (1976).

Rooney, "Synthesis of Phenol-Terminated Polyisobuylene: Competitive Chain Transfer Reactions," J. Appl. Poly. Sci. 25:1365-1372 (1980).

Roth et al., "A Novel Method of the Determination of Propagation Rate Constants: Carbocationic Oligomerization of Isobutylene," Macromolecules 29:6104-6109 (1996).

Sawamoto et al., "End Functionalized Polymers by Living Cationic Polymerization," Macromolecules 20:1-6 (1987).

Schriescheim et al., "Industrial Friedel-Crafts Chemistry: Past and Future," Chemtech 310 (1978).

Serniuk et al., "Study of the Reaction of Buna Rubbers of Aliphatic Mercaptans," J. Am. Chem. Soc. 70:1804-1808 (1948).

Si et al., "Living Carbocationic Polymerization. Narrow Molecular Weight Distribution Polyisobutylenes Prepared by Esters and Ketones as Electron Donors," Polymer Bulletin 33:651-656 (1994).

Simison et al., "End-Quenching of Quasiliving Carbocationic Isobutylene Polymerization with Hindered Bases: Quantitative Formation of Exo-Olefin-Terminated Polyisobutylene," Macromolecules 39:2481-2487 (2006).

Sita et al., "Amidinate-Based Catalysts for Stereoselective Living Ziegler-Natta Polymerizations," Abstracts of Papers of the American Chemical Society 224:U502-U502 (2002).

Stacey et al., Organic Reactions 13:150-208 and 233-233 (1963).

Storey et al., "Mechanistic Role of Lewis Bases and Other Additives in Quasiliving Carbocationic Polymerization of Isobutylene," Macromolecules 34:5416-5432 (2001).

Storey et al., "N-Methylpyrrole-Terminated Polyisobutylene Through End-Quenching of Quasiliving Carbocationic Polymerization," Macromolecules 38:4618-4624 (2005).

Tripathy et al., "Syntheses and Characterization of Polyisobutylene Macromonomers with Methacrylate, Acrylate, Glycidyl Ether, or Vinyl Ether End-Functionality," Macromolecules 42:3958-3964 (2009).

Ummadisetty et al., "Rapid Communication: Quantitative Syntheses of Novel Polyisobutylenes Fitted with Terminal Primary —Br, -OH, —NH$_2$, and Methacrylate Termini," J. Poly. Sci. Part A: Poly. Chem. 46:4236-4242 (2008).

Ummadisetty et al., "Synthesis of Exo-Olefin-Terminated Polyisobutylene by Sulfide/Based Quenching of Quasiliving Polyisobutylene," Polymer Reprints 52:411-412 (2011).

Wallace et al., "Intelligent Polymer Systems," Encyclopedia of Polymer Science and Technology pp. 231-250 (2004).

Wollyung et al., "Synthesis and Mass Spectrometry Characterization of Centrally and Terminally Amine-Functionalized Polyisobutylenes," J. Poly. Sci. Part A: Poly. Chem. 43:946-958 (2005).

Zhang et al., "Synthesis of Polyisobutylene With Arylamino Terminal Group by Combination of Cationic Polymerization with Alkylation," J. Poly. Sci. Part A: Poly. Chem. 46:936-946 (2008).

Zinger et al., "Timed Release of Chemicals from Polypyrrole Films," J. Am. Chem. Soc. 106:6861-6863 (1984).

Notice of Allowability mailed May 11, 2005, U.S. Appl. No. 10/600,898.

Notice of Allowability mailed Aug. 11, 2005, U.S. Appl. No. 10/600,898.

Notice of Allowance mailed May 4, 2009, U.S. Appl. No. 11/186,157.

Office Action mailed Feb. 20, 2009, U.S. Appl. No. 11/186,157.

Office Action mailed Apr. 1, 2008, U.S. Appl. No. 11/186,157.

Office Action mailed Oct. 20, 2008, U.S. Appl. No. 11/186,157.

Notice of Allowance mailed Aug. 6, 2009, U.S. Appl. No. 11/207,264.

Notice of Allowance mailed Dec. 10, 2009, U.S. Appl. No. 11/207,264.

Office Action mailed Nov. 12, 2008, U.S. Appl. No. 11/207,264.

Notice of Allowance mailed Aug. 7, 2009, U.S. Appl. No. 11/207,366.

Supplemental Notice of Allowance mailed Apr. 2, 2010, U.S. Appl. No. 11/207,366.

Notice of Allowance mailed Jun. 11, 2008, U.S. Appl. No. 11/207,377.

Office Action mailed Jan. 2, 2008, U.S. Appl. No. 11/207,377.

Office Action mailed Mar. 23, 2007, U.S. Appl. No. 11/207,377.

Notice of Allowance mailed Apr. 28, 2010, U.S. Appl. No. 11/356,490.

Office Action mailed Jan. 8, 2009, U.S. Appl. No. 11/356,490.

Office Action mailed Aug. 31, 2009, U.S. Appl. No. 11/356,490.

Notice of Allowance mailed Dec. 3, 2008, U.S. Appl. No. 11/356,491.

Office Action mailed May 13, 2008, U.S. Appl. No. 11/356,491.

Notice of Allowance mailed Apr. 15, 2011, U.S. Appl. No. 11/357,562.

Final Office Action mailed Apr. 2, 2010, U.S. Appl. No. 11/357,562.

Office Action mailed Aug. 7, 2009, U.S. Appl. No. 11/357,562.

Office Action mailed Dec. 5, 2008, U.S. Appl. No. 11/357,562.

Final Office Action mailed Jan. 21, 2011, U.S. Appl. No. 12/055,281.

Office Action mailed Jun. 11, 2010, U.S. Appl. No. 12/055,281.

Supplemental Final Office Action and Interview Summary mailed Apr. 29, 2011, U.S. Appl. No. 12/055,281.

Notice of Allowance mailed Mar. 22, 2011, U.S. Appl. No. 12/145,460.

Notice of Allowance mailed Jul. 8, 2011, U.S. Appl. No. 12/145,460.

Notice of Allowance mailed Nov. 4, 2011, U.S. Appl. No. 12/256,441.

Notice of Allowance mailed Sep. 10, 2012, U.S. Appl. No. 12/355,664.

Office Action mailed Jan. 19, 2012, U.S. Appl. No. 12/355,664.

Office Action mailed Jun. 25, 2012, U.S. Appl. No. 12/415,829.

Notice of Allowance mailed Nov. 9, 2012, U.S. Appl. No. 12/534,081.

Office Action mailed Sep. 26, 2012, U.S. Appl. No. 12/767,672.

Final Action mailed Feb. 14, 2013, U.S. Appl. No. 12/767,672.

Office Action mailed May 8, 2012, U.S. Appl. No. 12/767,676.

Notice of Allowance mailed Oct. 23, 2012, U.S. Appl. No. 12/767,676.

Office Action mailed Oct. 3, 2012, U.S. Appl. No. 12/815,312.

Notice of Allowance mailed Oct. 23, 2012, U.S. Appl. No. 13/396,517.

* cited by examiner

METHODS FOR PRODUCING TELECHELIC POLYOLEFINS FROM TERPENE INITIATORS

1. FIELD

Provided herein are methods for the preparation of telechelic polyolefins via polymerization reaction with a terpene initiator.

2. BACKGROUND

Telechelic polymers are polymers that contain one or more functional groups at the end of the polymer. These functional groups are reactive to other molecules, thereby allowing derivatization of the polymer at its chain ends. Indeed, telechelic polymers serve as useful intermediates for the preparation of a diverse range of desirable polymeric products, including high performance polymers such as, but not limited to, fuel or lube oil additives, network polymers, star-branched polymers, and block co-polymers.

In general, the known methods of synthesizing telechelic polymers rely on post-polymerization functionalization techniques. For example, a monomer is first polymerized to form an initial polymer product. To form the telechelic polymer, this initial polymer product must be subjected to a subsequent post-polymerization reaction to install the reactive functional group. Such methods are inefficient and costly. Thus, there is a need for a more direct route to telechelic polymers.

3. SUMMARY

Provided herein are methods for producing telechelic polyolefins from a polymerization reaction that employs a terpene initiator. In some embodiments, these terpene initiators contain a functional group that survives the polymerization process, thereby providing—directly from the polymerization process—a polymer that contains said functional group. For example, in some embodiments, when a terpenoid containing a hydroxyl group is employed as an initiator, the resulting polyolefin product will contain a corresponding terpenoid moiety containing a hydroxyl group.

In some embodiments, provided herein are methods for synthesizing a telechelic polymer comprising contacting a terpene initiator with a Lewis acid in the presence of one or more monomers, wherein the terpene initiator contains:

(a) one or more tertiary carbons containing a leaving group, and (b) one or more functional groups, wherein the one or more functional groups are bonded to a primary or secondary carbon and are unmodified under polymerization conditions.

Furthermore, provided herein are compounds having the following formula:

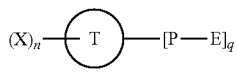

wherein:

is a terpene moiety;
X is a functional group attached to a primary or secondary carbon;
P is a divalent polyolefin group;
E is an end-cap group;
q is an integer from 1-5; and
n is an integer from 1-3.

4. DETAILED DESCRIPTION

(a) Definitions

Unless defined otherwise, all technical and scientific terms used herein have the same meaning as commonly understood by one of ordinary skill in the art. In the event that there are a plurality of definitions for a term used herein, the definitions provided in this section prevail unless stated otherwise.

As used herein, "alkyl" refers to a uni-valent hydrocarbon group of about 1 to about 20 carbons. In some embodiments, the alkyl group contains about 1 to about 15 carbons. In some embodiments, the alkyl group contains about 1 to about 10 carbons. In some embodiments, the alkyl group contains about 1 to about 8 carbons. In some embodiments, the alkyl group contains about 1 to about 6 carbons. In some embodiments, the alkyl group contains about 1 to about 3 carbons. In some embodiments, the alkyl group contains 1 to 2 carbons. In some embodiments, the alkyl group is primary. In some embodiments, the alkyl group is secondary. In some embodiments, the alkyl group is tertiary. In some embodiments, the alkyl group is methyl, ethyl, n-propyl, isopropyl, isobutyl, n-butyl, sec-butyl, tert-butyl, isopentyl, neopentyl, tert-pentyl, or isohexyl. In some embodiments, the alkyl group is methyl, ethyl, n-propyl, or isopropyl. In some embodiments, the alkyl group is methyl. In some embodiments, the alkyl group is tert-butyl. In some embodiments, the alkyl group is a straight hydrocarbon chain. In some embodiments, the alkyl group is a branched hydrocarbon chain. In some embodiments, the alkyl group is cyclic. In some embodiments, the alkyl group is substituted.

As used herein, "alkenyl" refers to a uni-valent hydrocarbon group of 2 to about 20 carbons, wherein the chain or group contains one or more double bonds. In some embodiments, the alkenyl group contains 2 to about 15 carbons. In some embodiments, the alkenyl group contains 2 to about 10 carbons. In some embodiments, the alkenyl group contains 2 to about 8 carbons. In some embodiments, the alkenyl group contains 2 to about 6 carbons. In some embodiments, the alkenyl group contains 2 to 3 carbons. In some embodiments, the alkenyl group is an allyl group. In some embodiments, the alkenyl group contains one or more double bonds that are conjugated to another unsaturated group. In some embodiments, the alkenyl group is substituted.

As used herein, "alkynyl" refers to a uni-valent hydrocarbon group of 2 to about 20 carbons, wherein the chain contains one or more triple bonds. In some embodiments, the alkynyl group contains 2 to about 15 carbons. In some embodiments, the alkynyl group contains 2 to about 10 carbons. In some embodiments, the alkynyl group contains 2 to about 8 carbons. In some embodiments, the alkynyl group contains 2 to about 6 carbons. In some embodiments, the alkynyl group contains 2 to 3 carbons. In some embodiments, the alkynyl group is a propargyl group. In some embodiments, the alkynyl group contains one or more triple bonds that are conjugated to another unsaturated group. In some embodiments, the alkynyl group is substituted.

As used herein, "aryl" refers to a uni-valent monocyclic or multicyclic aromatic group containing from 6 to about 30 carbons. In some embodiments, the aryl group is monocyclic. In some embodiments, the aryl group contains 6 to about 15 carbons. In some embodiments, the aryl group contains 6 to about 10 carbons. In some embodiments, the aryl group is fluorenyl, phenyl, or naphthyl. In some embodiments, the aryl group is phenyl. In some embodiments, the aryl is substituted.

As used herein, "alkaryl" refers to a uni-valent aryl group substituted with at least one alkyl, alkenyl, or alkynyl group.

As used herein, "aralkyl" refers to a uni-valent alkyl, alkenyl, or alkynyl group substituted with at least one aryl group.

As used herein, "substituted" refers to the presence of one or more substituents. In some embodiments, one substituent is present. As used herein, substituent refers to a monovalent atom or monovalent group of bonded atoms that is capable of forming a stable bond with the molecule to which the substituent is attached.

As used herein, "leaving group" refers to a substituent that is capable of dissociating from the atom to which the leaving group is attached. In some embodiments, the leaving group is capable of dissociating under the polymerization conditions used in the methods described herein. In some embodiments, the leaving group is attached to a secondary or tertiary carbon, and the dissociation of the leaving group allows the formation of a secondary or tertiary carbocation, or its reactive equivalent. In some embodiment, the leaving group dissociates when contacted with a Lewis acid.

As used herein, "functional group" refers to a substituent that can serve as a site of chemical reactivity on a molecule to which the substituent is attached. Functional groups include, without limitation, —OH, —F, —Cl, —Br, —I, =O, —OC(O)$R^A$, —O$R^A$, —NC, —NCO, —OCN, —SH, —S$R^A$, —S(O)$R^A$, —S(O)$_2R^A$, —SCN, —NO$_2$, —OS(O)$_2R^A$, an alkenyl group, or an alkynyl group.

As used herein, a terpene initiator functional group that is "unmodified under polymerization conditions" refers to a functional group that, if subjected to the polymerization conditions that are used to perform the methods described herein, is present on and will be bonded to the same carbon of the corresponding terpene initiator residue of the telechelic polyolefin product. It is to be understood that, in the context used herein, a functional group may be unmodified under polymerization conditions, but still participate in acid/base and/or protonation/deprotonation reactions during the course of the polymerization reaction, workup of the polymerization reaction, and/or isolation of the telechelic polyolefin from the polymerization reaction. For example, a hydroxyl functional group, when subjected to cationic polymerization conditions utilizing a titanium tetrahalide, may interact with titanium species during the course of polymerization, but still be "unmodified under polymerization conditions," as long as the hydroxyl group is present on the same carbon of the corresponding initiator residue of the telechelic polyolefin product. It is to be understood that the term functional group is not, by itself, an alkyl group or hydrogen. In some embodiments, the functional group, while unmodified during a polymerization reaction, may serve as a site of chemical reactivity under other conditions in a reaction subsequent to the polymerization reaction, thereby allowing for derivatization of the polymerization product.

As used herein, "polyolefin" refers to a polymer that comprises at least two olefin monomer units. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 1,000 to 5,000 g/mol. In some embodiments, the polyolefin has a molecular weight of from about 2,000 to 3,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1,000 g/mol. In some embodiments, the polyolefin has a molecular weight greater than 5,000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol.

As used herein, "divalent polyolefin group" refers to a substituent that is a divalent polyolefin. In some embodiments, the points of attachment are at the terminal ends of the divalent polyolefin. In some embodiments, the divalent polyolefin group is a divalent polyisobutylene group.

As used herein, "polyisobutylene group" refers to a divalent polyolefin group comprising at least 2 isobutylene monomer units. In some embodiments, the polyisobutylene group is

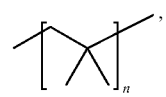

wherein n is an integer from about 10 to about 20000. In some embodiments, n is about 10 to about 15,000. In some embodiments, n is about 10 to about 10,000. In some embodiments, n is about 10 to about 5,000. In some embodiments, n is about 10 to about 2,000. In further embodiments, n is about 10 to about 1,000. In further embodiments, n is about 10 to about 500. In further embodiments, n is about 10 to about 250. In further embodiments, n is about 10 to about 100. In further embodiments, n is about 10 to about 50.

As used herein, "quenching agent" refers to a compound that reacts with a growing polymer and causes the formation of a functional group to form a telechelic polymer. In some embodiments, the quenching agent reacts with a cationic polymer to form a telechelic polyolefin. In some embodiments, the quenching agent end-caps the growing polymer. In some embodiments, the quenching agent reacts with the growing polymer to form an olefin-terminated polymer.

As used herein, "end-cap group" refers to a substituent that is bonded to a terminal end of a polymer. In some embodiments, the end-cap group may serve as a site of reactivity under suitable reaction conditions, thereby allowing derivatization of the polymer at its terminal end.

As used herein, "Lewis acid" refers to a chemical entity that is capable of accepting a pair of electrons.

As used herein, "monomer" refers to a compound that is capable of forming one of the two or more divalent molecules that are contained in a polymer. In some embodiments, the monomer is an olefin. In some embodiments, the monomer is capable of reacting with a carbocation to form another carbocation. In some embodiments, the monomer is isobutene.

As used herein, "initiator" refers to a compound that provides a carbocation or its reactive equivalent.

As used herein, "electron donor" refers to a molecule that is capable of donating a pair of electrons to another molecule.

As used herein, "common ion salt" refers to an ionic salt that is optionally added to a reaction performed under quasiliving carbocationic polymerization conditions to prevent dissociation of the propagating carbenium ion and counter-ion pairs.

As used herein, "common ion salt precursor" refers to an ionic salt that is optionally added to a reaction performed under quasiliving carbocationic polymerization conditions, wherein the ionic salt generates counter-anions that are identical to those of the propagating chain ends, via in situ reaction with a Lewis acid.

As used herein, "contacting" refers to bringing two or more compounds into physical contact with each other. In some embodiments, two or more compounds react with each other when contacted.

As used herein, "reacting" refers to contacting two or more compounds with each other, wherein at least one of said two or more compounds is chemically transformed into a different compound.

As used herein, "alkyl aluminum halide" refers to a compound of formula $R_nAlX_3$-n, wherein n is 1, 1.5, or 2; R is an alkyl group; and X is a halogen, and mixtures thereof.

As used herein, "intermediate" refers to a compound. In some embodiments, the intermediate is ionic. In some embodiments, the intermediate is cationic.

As used herein, "about" refers to up to plus or minus 10% of the indicated number. For example, "about 25° C." refers to 22.5° C. to 27.5° C. In some embodiments, about refers to up to plus or minus 9, 8, 7, 6, 5, 4, 3, 2, or 1% of the indicated number. When only integer values are possible, "about" refers to up to plus or minus 10% rounded to the nearest integer number. For example, "about 9 carbons" refers to 8-11 carbons.

It is to be understood that the compounds or structures provided herein may contain one or more chiral centers. Such chiral centers may be either the (R) or (S) configuration, or may be a mixture thereof. Thus, the compounds provided herein may be enantiomerically pure, or be stereoisomeric or diastereomeric mixtures. For a compound containing one or more double bonds, the compound may exist as the corresponding cis, trans, E, or Z isomer, or a mixture thereof.

For the structures depicted herein, it is to be understood that when a substituent bond is not directly connected on a particular carbon, the substituent may be bonded at any carbon atom in the carbon skeleton. For example, for the following structure:

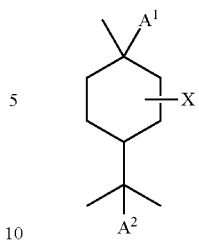

it is to be understood that, unless stated otherwise herein, X may be bonded to any of the carbons on the depicted skeleton, including for example:

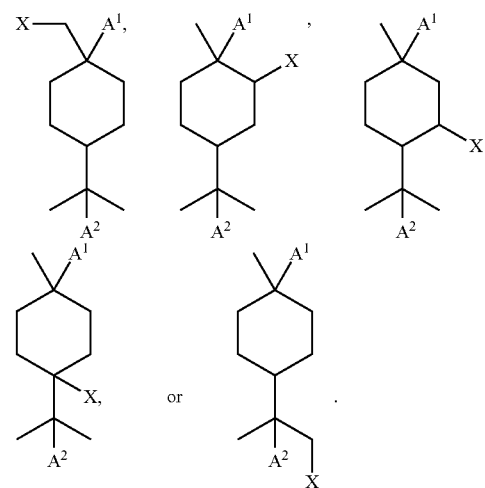

(b) Methods for Synthesizing Telechelic Polyolefins

In some embodiments, provided herein are methods for synthesizing a telechelic polyolefin comprising contacting a terpene initiator with a Lewis acid in the presence of one or more monomers, wherein the terpene initiator contains:
  (a) a tertiary carbon containing a leaving group, and
  (b) one or more functional groups, wherein the one or more functional groups are bonded to a primary or secondary carbon and are unmodified under polymerization conditions.

Without being bound to any theory, in some embodiments, the terpene initiator ionizes or reacts with the Lewis acid to form an intermediate, which in some embodiments, subsequently reacts with the one or more monomers. In some embodiments, the terpene initiator ionizes or reacts with the Lewis acid to become a carbocation or its reactive equivalent.

In some embodiments, the method further comprises adding one or more quenching agents.

In some embodiments, the method further comprises adding one or more terminators.

In some embodiments, the method is performed in the presence of one or more electron donors.

In some embodiments, the method is performed in the presence of one or more common ion salts or common ion salt precursors.

In some embodiments, the method is performed in the presence of a diluent.

(i) Terpene Initiators

Exemplary terpene initiators for used in the methods described herein contain (a) one or more tertiary carbons containing one or more leaving groups, and (b) one or more functional groups, wherein the one or more functional groups are bonded to a primary or secondary carbon and are unmodified under polymerization conditions.

A leaving group is a substituent that is capable of dissociating from the atom to which the leaving group is attached. In some embodiments, the leaving group is capable of dissociating under the polymerization conditions used in the methods described herein. In some embodiments, the leaving group is attached to a secondary or tertiary carbon, and the dissociation of the leaving group allows the formation of a secondary or tertiary carbocation, or its reactive equivalent. In some embodiment, the leaving group dissociates when contacted with a Lewis acid. In some embodiments, the leaving group is —Cl, —Br, —I, —OR$^A$, —OC(O)R$^A$, -TsOH, or —OMs, wherein R$^A$ is alkyl. In some embodiments, the leaving group is —Cl. When two or more leaving groups are present on the initiator, monomers may react at any of the two or more corresponding tertiary carbons and, thus, propagation may occur at two or more sites during the course of a single polymerization reaction.

A functional group that is unmodified under polymerization conditions refers to a functional group that, if subjected to the polymerization conditions that are used to perform the methods described herein, is present on and will be bonded to the same carbon of the corresponding terpene initiator residue of the telechelic polyolefin product. It is to be understood that, in the context used herein, a functional group may be unmodified under polymerization conditions, but still participate in acid/base and/or protonation/deprotonation reactions during the course of the polymerization reaction, workup of the polymerization reaction, and/or isolation of the telechelic polyolefin from the polymerization reaction. It is to be understood that the term functional group is not, by itself, an alkyl group or hydrogen. In some embodiments, the functional group, while unmodified during a polymerization reaction, may serve as a site of chemical reactivity under other conditions in a reaction subsequent to the polymerization reaction, thereby allowing for derivatization of the polymerization product.

In some embodiments, the terpene initiator contains 10, 15, or 20 carbons, excluding any carbon contained in the leaving group or functional group. In some embodiments, the terpene initiator contains 10 carbon atoms, excluding any carbon contained in the leaving group or functional group.

In some embodiments, the terpene initiator is selected from:

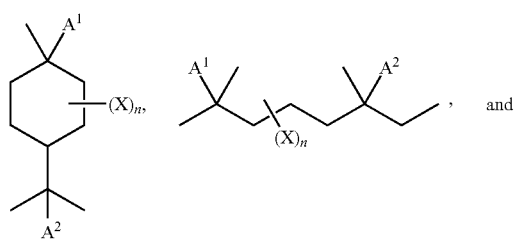

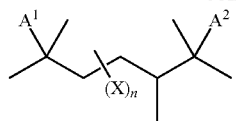

wherein:

A$^1$ and A$^2$ are each, individually at each occurrence, a leaving group or —H, wherein at least one of A$^1$ and A$^2$ is a leaving group;

X is —OH, —F, —Cl, —Br, —I, =O, —OC(O)R$^A$, —OR$^A$, —NC, —NCO, —OCN, —SH, —SR$^A$, —S(O)R$^A$, —S(O)$_2$R$^A$, —SCN, —NO$_2$, or —OS(O)$_2$R$^A$, wherein R$^A$ is alkyl, alkenyl, or alkynyl, and X is bonded to a primary or secondary carbon; and n is an integer from 1-3.

The leaving groups are substituents that are capable of ionizing under polymerization conditions, thereby converting the carbons to which they are attached into a carbocation or its reactive equivalent. In some embodiments, the leaving group leaves to form a carbocation or its reactive equivalent when contacted with one or more Lewis acids. In some embodiments, the leaving group is —Cl, —Br, —I, —OR$^A$, —OCOR$^A$, -TsOH, or —OMs, wherein R$^A$ is alkyl. In some embodiments, the leaving group is —Cl.

In some embodiments, one of A$^1$ or A$^2$ is H.

In some embodiments, X is —OH, —F, —Cl, —Br, —I, =O, —OC(O)R$^A$, or —OR$^A$. In some embodiments, X is —OH, —Br, —OCH$_3$, or —OC(O)CH$_3$. In some embodiments. X is —OH.

In some embodiments, X is bonded to a primary carbon.

In some embodiments, R$^A$ is alkyl. In some embodiments, R$^A$ is alkyl of 1 to 6 carbons. In some embodiments, R$^A$ is methyl.

In some embodiments, n is 1.

In some embodiments, the terpene initiator is

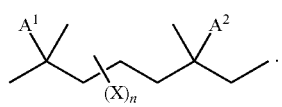

In some embodiments, the terpene initiator is

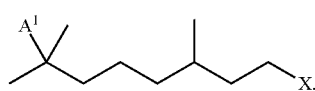

In further embodiments, X is —OH, —Br, —Cl, or —I and A$^1$ is —Cl. In further embodiments, the terpene initiator is

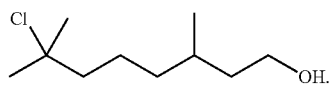

In some embodiments, the terpene initiator is

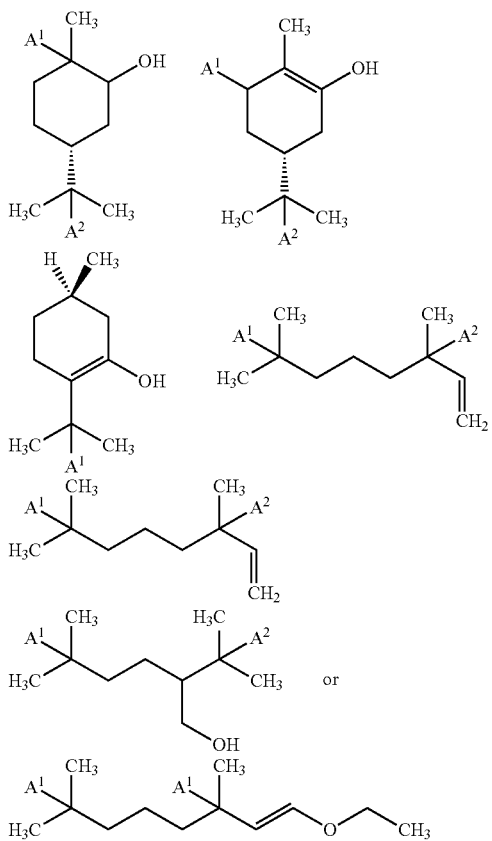

wherein $A^1$ and $A^1$ are each, independently, a leaving group. In some embodiments, the leaving group is —Cl, —Br, —I, —$OR^A$, —$OCOR^A$, -TsOH, or —OMs, wherein $R^A$ is alkyl. In some embodiments, the leaving group is —Cl, —Br, or —I. In some embodiments, the leaving group is —Cl.

In some embodiments, the concentration of the terpene initiator is from about 0.005 M to about 1.0 M based on total volume of the reaction mixture. In some embodiment, the concentration of the terpene initiator is from about 0.01 M to about 0.75 M. In some embodiments, the concentration of the terpene initiator is from about 0.01 M to about 0.5 M. In some embodiments, the concentration of the terpene initiator is from about 0.01 M to about 0.1 M. In some embodiments, the concentration of the terpene initiator is from about 0.03 M to about 0.1 M. In some embodiments, the concentration of the terpene initiator is from about 0.03 M to about 0.06 M.

(ii) Synthesis of Terpene Initiators

The terpene initiators used herein are, in some embodiments, synthesized from a terpene. As used herein, a "terpene" is a hydrocarbon compound that contains two or more 5-carbon units, thus containing carbon atoms in multiples of five (starting at ten), e.g., 10, 15, 20, or 25 carbon atoms. A terpene may, for example, be a monoterpene (10-carbon terpene), sesquiterpene (15-carbon terpene), diterpene (20-carbon terpene), or triterpene (30-carbon terpene). The 5-carbon units are often referred to as isoprene units and are monovalent or multivalent molecules having the following possible structures:

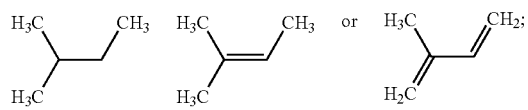

wherein one or more of the hydrogen atoms are replaced with a bond. Certain carbon atoms of an isoprene unit may be categorized as a "head carbon" or "tail carbon" as shown below.

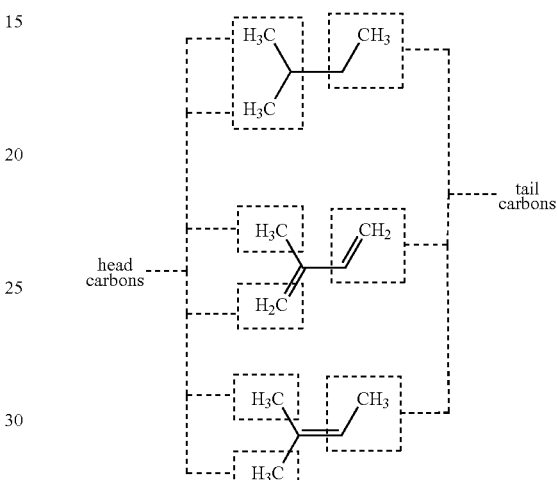

For a given terpene, each individual isoprene unit may be linked to an adjacent isoprene unit at any carbon. For example, adjacent isoprene units may be linked tail to head, tail to tail, or head to head. Furthermore, at least two isoprene units of a terpene may be linked in such a manner so as to form a cyclic membered ring, including for example, 5- or 6-membered rings. Examples include, but are not limited to, limonene and β-pinene.

A terpene may also contain one or more stereocenters.

The terpene initiators described herein are synthesized, in some embodiments, by subjecting a terpene to reaction conditions that are suitable to install (1) one or more leaving groups on a tertiary terpene carbon that makes said carbon ionizable under polymerization conditions and that allows propagation to take place on the initiator and (2) one or more functional groups, wherein the one or more functional groups are bonded to a primary or secondary carbon and are unmodified under polymerization conditions.

In some embodiments, the terpene initiators used herein are synthesized from an unsaturated terpene. In some embodiments, the terpene initiators used herein are synthesized via hydrohalogenation of an unsaturated terpene. For example, β-citronellol may be hydrochlorinated via reaction with gaseous HCl to form 7-chloro-3,7-dimethyloctan-1-ol.

Exemplary terpenes from which the terpene initiators described herein are synthesized include, but are not limited to compounds having the following structures:

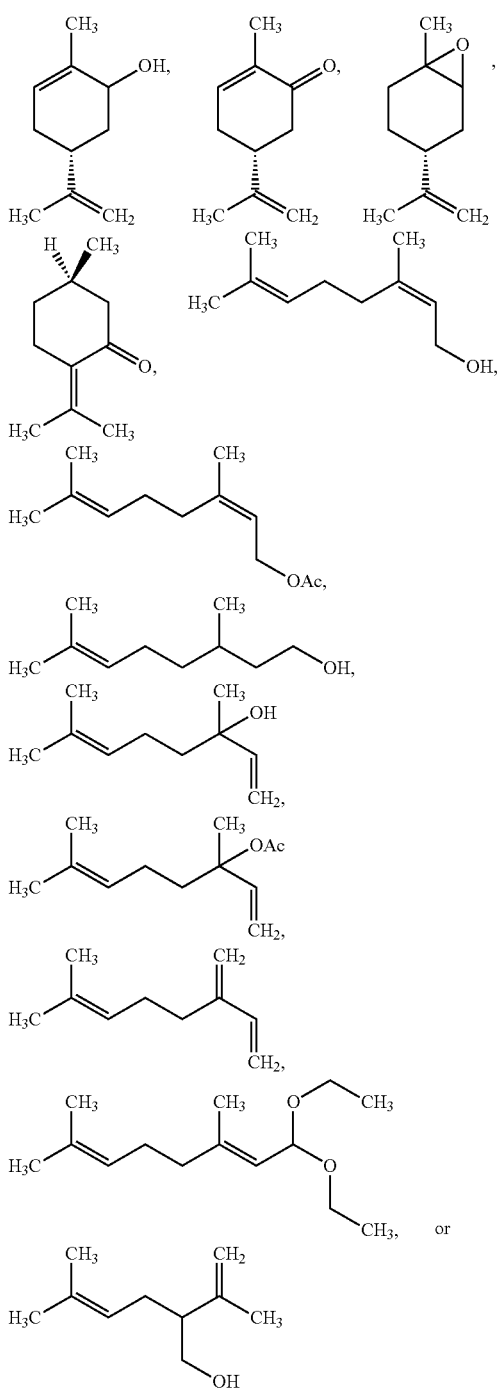

In some embodiments, the terpene initiator is the hydrohalogenation product of a compound above.

(iii) Lewis Acids

In some embodiments, the Lewis acid is a non-protic acid. In some embodiments, the Lewis acid is a metal halide or non-metal halide. In some embodiments, the Lewis acid is a metal halide. In some embodiments, the Lewis acid is a titanium (IV) halide, a zinc (II) halide, a tin (IV) halide, or an aluminum (III) halide. In some embodiments, the Lewis acid is a titanium(IV) halide. In some embodiments, the Lewis acid is a tin (IV) halide. In some embodiments, the Lewis acid an aluminum (III) halide. In some embodiments, the Lewis acid is titanium tetrabromide or titanium tetrachloride. In some embodiments, the Lewis acid is titanium tetrachloride. In some embodiments, the Lewis acid is zinc chloride. In some embodiments, the Lewis acid is AlBr$_3$. In some embodiments, the Lewis acid is ethyl aluminum dichloride. In some embodiments, the Lewis acid is methyl aluminum dichloride. In some embodiments the Lewis acid is a non-metal halide. In some embodiments, the Lewis acid is an antimony (VI) halide, a gallium (III) halide, or a boron (III) halide. In some embodiments, the Lewis acid is boron trichloride. In some embodiments, the Lewis acid is a trialkyl aluminum compound. In some embodiments, the Lewis acid is trimethyl aluminum.

In some embodiments, one Lewis acid is used. In some embodiments, a mixture of two or more Lewis acids is used. In some embodiments, a mixture of two Lewis acids is used. In some embodiments, a mixture of an aluminum (III) halide and trialkyl aluminum compound is used. In some embodiments, a stoichiometric ratio of about 1:1 aluminum (III) halide to trialkyl aluminum compound is used. In some embodiments, a stoichiometric ratio of 2:1 aluminum (III) halide to trialkyl aluminum compound is used. In some embodiments, a stoichiometric ratio of 1:2 aluminum (III) halide to trialkyl aluminum is used. In some embodiments, the stoichiometric ratio of aluminum (III) halide to trialkyl aluminum is greater than 1. In some embodiments, the stoichiometric ratio of aluminum (III) halide to trialkyl aluminum is less than 1. In some embodiments, a mixture of aluminum trichloride and trimethyl aluminum is used.

In some embodiments, the Lewis acid is a titanium halide, aluminum halide, boron halide, or an alkyl aluminum halide, as defined herein.

In some embodiments, the Lewis acid is an alkyl aluminum halide. In some embodiments, the alkyl is methyl or ethyl. In some embodiments, the halide is —Cl or —Br.

In some embodiments, the Lewis acid may be added in one aliquot or added in two or more aliquots over the course of the polymerization.

In some embodiments, the Lewis acid concentration is from about 0.10 to about 10 times the concentration of the terpene initiator. In some embodiments, the Lewis acid concentration is from about 1.0 to about 8.0 times the concentration of the terpene initiator. In some embodiments, the Lewis acid concentration is from 2.0 to about 5.0 times the concentration of the terpene initiator.

In some embodiments, the molar concentration of Lewis acid is from about 0.5 to about 20 times the molar concentration of chain ends. In some embodiments, the molar concentration of Lewis acid is from about 0.5 to about 15 times the molar concentration of chain ends. In some embodiments, the molar concentration of Lewis acid is from about 1.0 to about 10 times the molar concentration of chain ends. In some embodiments, the molar concentration of Lewis acid is from about 1.0 to about 8 times the molar concentration of chain ends. In some embodiments, the molar concentration of Lewis acid is from about 2 to about 5 times the molar concentration of chain ends.

In some embodiments, an additional aliquot of one or more Lewis acids is added after the addition of the quenching agent.

(iv) Monomers

In some embodiments, the monomer is a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms.

In some embodiments, the methods described herein can be employed for the polymerization of such monomers to produce polymers of different, but uniform molecular weights. In some embodiments, such molecular weight is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

In some embodiments, the monomer is isobutene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or styrene. In some embodiments, the monomer is isobutene. In some embodiments, the monomer is styrene.

In some embodiments, mixtures of monomers are employed.

In some embodiments, the monomer is consumed prior to adding the quenching agent, or undergoes high conversion prior to adding the quenching agent. In particular embodiments, about 80%, about 85%, about 90%, about 95%, about 97%, about 99%, or about 100% of the monomer is consumed prior to adding the quenching agent.

In some embodiments, one or more aliquots of additional monomer are added to the polymerization after the initial monomer charge, wherein each individual aliquot of additional monomer is consumed or partially consumed prior to adding a subsequent aliquot of additional monomer or adding the quenching agent. As used herein, partially consumed refers to, in some embodiments, about 2, about 5, about 10, about 15, about 20, about 25, about 30, about 35, about 40, about 45, about 50, about 55, about 60, about 65, about 70, about 75. about 80, about 85, about 90, about 95, or about 97 percent consumed by mole or mass.

In some embodiments, 2 to 20 aliquots of additional monomer are added. In some embodiments, 5-10 aliquots of additional monomer are added. In some embodiments, all monomers are charged to the polymerization together.

(v) Quenching AGENTS

Suitable quenching agents for use in the methods described herein, in some embodiments, react with and/or cap a growing polymer, thereby installing a functional group to form a telechelic polymer.

In some embodiments, the quenching agent is selected from those disclosed in Stokes et al., U.S. Patent Publication No. 2004/0260033A1 (U.S. application Ser. No. 10/600,898) and Stokes et al., U.S. Patent Publication No. 2005/0282972A1 (U.S. application Ser. No. 11/086,157), both of which are incorporated herein by reference in their entireties. Exemplary quenching agents include, but are not limited to those having the following formula:

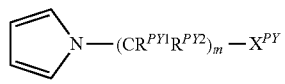

wherein $R^{PY1}$ and $R^{PY2}$ are independently in each —$(CR^{PY1}R^{PY2})$— unit selected from the group consisting of hydrogen and alkyl of 1 to 6 carbon atoms;
m is an integer from 1 to 20; and
X is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)N$R^{PY6}R^{PY7}$, —P($R^{PY8}$)$_3$, —P(O$R^{PY9}$)$_3$, —S$R^{PY10}$, —OSO$_3R^{PY11}$, and —S(O)$R^{PY12}$;
wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl.

Further examples include, but are not limited to 1-methylpyrrole and 1-furfurylpyrrole. In some embodiments, these quenching agents provide N-substituted pyrrole terminated polyolefins.

In some embodiments, the quenching agent is selected from those disclosed in Stokes et al., U.S. Patent Publication No. 2006/0041081A1 (U.S. application Ser. No. 11/207,264), which is incorporated herein by reference in its entirety. Exemplary quenching agents include, but are not limited to one or more nitrogen-containing five-membered aromatic ring compounds selected from pyrroles and imidazoles having at least two hydrocarbyl substituents on the ring, or one or more hindered secondary or tertiary amines containing only carbon, hydrogen, and nitrogen atoms, or mixtures thereof, provided the nitrogen containing five-membered aromatic ring is not: 2,4-dimethylpyrrole; 2-phenylindole; 2-methylbenzimidazole; 1,2-dimethylimidazole; 2-phenylmidazole; and 2,4,5-triphenylmidazole; and provided the hindered secondary or tertiary amines are not: triethylamine; tri-n-butylamine; trihexylamine; triisooctylamine; 2-phenylpyridine; 2,3-cyclododecenopyridine; di-p-tolylamine; quinaldine; and 1-pyrrolidino-1-cyclopentene. In some embodiments, the one or more nitrogen-containing five-membered aromatic ring compound have the following formula:

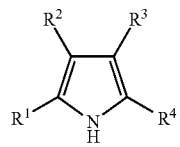

wherein:
(a) $R^1$ and $R^4$ are independently an alkyl containing one carbon atom to about 20 carbon atoms. $R^2$ and $R^3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R^1$ and $R^2$ form a fused aromatic ring of from 6 carbon atoms to 10 carbon atoms or an aliphatic ring of from 4 carbon atoms to about 8 carbon atoms, R is alkyl containing one carbon atom to about 20 carbon atoms, and $R^3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(c) $R^2$ and $R^3$ form a fused aromatic ring of from 6 carbon atoms to 10 carbon atoms or an aliphatic ring of from 4 carbon atoms to about 8 carbon atoms, and $R^1$ and $R^4$ are independently an alkyl containing one carbon atom to about 20 carbon atoms; or
(d) both $R^1$ and $R^2$, and $R^3$ and $R^4$, taken in pairs, independently form a fused aromatic ring of from 6 carbon atoms to 10 carbon atoms or an aliphatic ring of from 4 carbon atoms to about 8 carbon atoms.

Further examples include, but are not limited to 2,5-dimethylpyrrole. In some embodiments, these quenching agents provide vinylidene-terminated polyolefins.

In some embodiments, the quenching agent is selected from those disclosed in Stokes et al., U.S. Patent Publication No. 2007/0155908A1 (U.S. application Ser. No. 11/356, 491), which is incorporated herein by reference in its entirety. Exemplary quenching agents include compounds having the following formula:

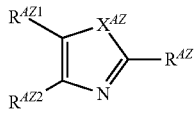

wherein: $R^{AZ1}$ and $R^{AZ2}$ are independently hydrogen, alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R^{AZ1}$ and $R^{AZ2}$ together form a fused aromatic ring having from 6 to 10 carbon atoms which may be unsubstituted or substituted with 1 to 4 substituents selected independently from alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula —$NR^{AZ*}R^{AZ**}$, where $R^{AZ*}$ and $R^{AZ**}$ are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms;

$R^{AZ}$ is hydrogen, alkyl from 1 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms, with the proviso that when $R^{AZ}$ is hydrogen, than $R^{AZ2}$ is branched alkyl having at least three carbon atoms, aryl, cycloalkyl, alkaryl, or aralkyl, and with the further proviso that when $R^{AZ}$ is methyl then $R^{AZ1}$ and $R^{AZ2}$ are independently selected from alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; and $X^{AZ}$ is oxygen or sulfur.

Exemplary quenching agents include, but are not limited to 2-phenylbenzoxazole, 2-phenylbenzothiazole, and 2,5-diphenyloxazole. In some embodiments, these quenching agents provide vinylidene-terminated polyolefins.

In some embodiments, the quenching agent is selected from those disclosed in Stokes, U.S. Patent Publication No. 2007/0155910A1 (U.S. application Ser. No. 11/356,490), which is incorporated herein by reference in its entirety. Exemplary quenching agents include, but at re not limited to polypyrrole, poly(2-vinylpyridine), polyphenothiazine, poly (pyrrole-co-furan), and poly(pyrrole-co-thiophene). In some embodiments, these quenching agents provide vinylidene-terminated polyolefins.

In some embodiments, the quenching agent is selected from those disclosed in Stokes et al., U.S. Patent Publication No. 2007/0155911A1 (U.S. application Ser. No. 11/357, 562), which is incorporated herein by reference in its entirety. Exemplary quenching agents include but are not limited to substituted morpholines, substituted thiomorpholines, and substitute phenothiazines. In some embodiments, the quenching agent is a compound having the following formula:

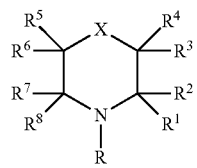

wherein:
$R^1$ through $R^8$ are independently hydrogen, alkyl from 1 to 20 carbon atoms, aryl from 6 to about 20 carbon atoms, alkaryl from about 7 to 30 carbon atoms, or aralkyl from about 7 to 30 carbon atoms;
R is hydrogen, alkyl from 1 to 20 carbon atoms, aryl from 6 to about 20 carbon atoms, alkaryl from about 7 to 30 carbon atoms, or aralkyl from about 7 to 30 carbon atoms; and X is oxygen or sulfur;
with the proviso that when R is hydrogen or methyl then $R^1$, $R^2$, $R^7$ and $R^8$ must be other than hydrogen unless one of $R^1$ or $R^2$ and one of $R^7$ or $R^8$ is independently branched alkyl of about 3 to 20 carbon atoms, aryl, alkaryl or aralkyl.

Further examples include, but are not limited to 4-ethyl morpholine, 4-phenylmorpholine, 10-methylphenothiazine, and phenoxazine. In some embodiments, these quenching agents provide vinylidene-terminated polyolefins.

In some embodiments, the quenching agent is selected from those disclosed in Stokes, U.S. Patent Publication No. 2009/0247716A1 (U.S. application Ser. No. 12/055,281), which is incorporated herein by reference in its entirety. Exemplary quenching agents include, but are not limited to compounds having the following formula:

wherein $R^1$ and $R^2$, are each, independently, hydrocarbyl. Examples include, but are not limited to diethylsulfide, dipropylsulfide, diisopropylsulfide, diallylsulfide, diisoamylsulfide. In some embodiments, following addition of the quenching agent, one or more alcohols or amines are added. Suitable amines or alcohols include, but are not limited to methanol, ethanol, isopropanol, diethylamine, triethylamine, n-butylamine, and tert-amylamine. In some embodiments, addition of these quenching agents followed by the one or more alcohols or amines provide vinylidene-terminated polyolefins.

In some embodiments, the quenching agent is selected from those disclosed in Storey et al., U.S. application Ser. No. 12/145,460, which is incorporated herein by reference in its entirety. Exemplary quenching agents include, but are not limited to alkoxysilanes and ethers. In some embodiments, the quenching agent is a compound having the following formula:

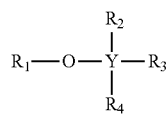

wherein Y is carbon or silicon; and
$R_1$ is hydrocarbyl, and $R_2$-$R_4$ are each, independently, hydrogen or hydrocarbyl. Exemplary quenching agents include, but are not limited to allyloxytrimethylsilane, methoxytrimethylsilane, ethoxytrimethylsilane, and tert-butyl ether. In some embodiments, a the quenching agents provide vinylidene-terminated polyolefins.

In some embodiments, the quenching agent is selected from those disclosed in Stokes, U.S. application Ser. No. 12/256,441, which is incorporated herein by reference in its entirety. Exemplary quenching agents include, but are not limited to compounds having the following formula:

wherein $R^{SA}$ and $R^{SB}$ are each, independently, alkyl, aryl, aralkyl, alkaryl,

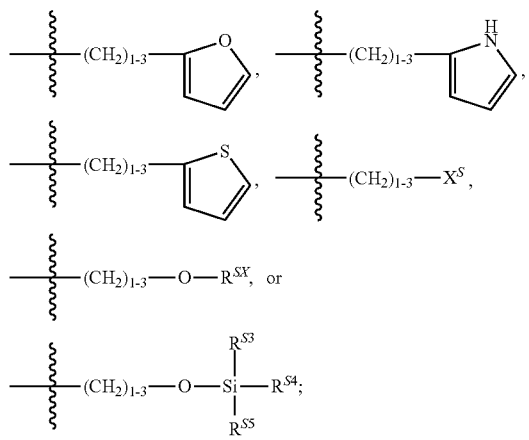

wherein $X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl.

In some embodiments, the quenching agent is furfurylmethyl disulfide, dimethyldisulfide, diethyldisulfide, diisopropyldisulfide, ditolyldisulfide, dibromoethyldisulfide, dichloroethyldisulfide, or di-tert-butyldiphenylsiloxyethyldisulfide. In some embodiments, following addition of the quenching agent, one or more alcohols, amines, or thiols are added. Exemplary alcohols include, but are not limited to R—OH, wherein R is alkyl of 1-8 carbons. Exemplary amines include, but are not limited to $NR^1R^2R^2$, wherein $R^1$ is alkyl, and $R^2$ and $R^3$ are each, independently, alkyl of 1-8 carbons. Exemplary thiols include, but are not limited to R—SH, wherein R is alkyl of 1 to 6 carbons. In some embodiments, the one or more alcohols, amines, or thiols is methanol, n-butylamine, 2-ethylhexylamine, tert-amylamine, ethanethiol, n-propanethiol, triethylamine, or dibutylamine. In some embodiments, the addition of the quenching agent following by the one or more alcohols, amines, or thiols provides sulfide-terminated polyolefins and/or vinylidene-terminated polyolefins.

In some embodiments, the quenching agent is butadiene.

In some embodiments, the quenching agent is selected from those disclosed in Stokes, U.S. application Ser. No. 12/355,664, which is incorporated herein by reference in its entirety. Exemplary quenching agents include, but are not limited to compounds having the following formula:

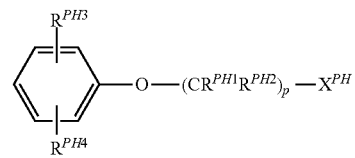

wherein $R^{PH1}$ and $R^{PH2}$ are each, independently in each —$(CR^{PH1}R^{PH2})$— unit, H or alkyl, and p is an integer from 0-20, wherein
(1) if p is 0, then $R^{PH3}$ and $R^{PH4}$ are each, independently, alkyl, and $X^{PH}$ is H;
(2) if p is 1, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, or

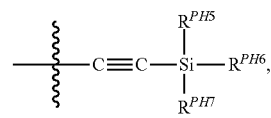

wherein $R^{PH5}$—$R^{PH7}$ are each, independently, alkyl or aryl;
(3) if p is 2, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

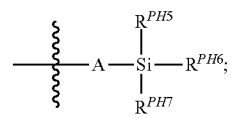

wherein A is

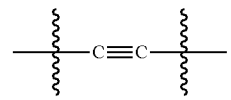 [SMILES: *C#C*]

or a single bond,
$R^{PH5}$ to $R^{PH7}$ are each, independently, alkyl, alkenyl, alkynyl, alkaryl, aralkyl, aryl, heteroaryl, alkoxy, hydroxy, $NR^{PH10}R^{PH11}$, —F, —Cl, —Br, —I, or —At,
$R^{PH8}$ is alkyl, alkenyl, alkynyl, alkaryl, aryl, or heteroaryl, and
$R^{PH9}$ to $R^{PH11}$ are each, independently, H, alkyl, alkenyl, alkynyl, alkaryl, aryl, or heteroaryl, or
when —O—$(CR^{PH1}R^{PH2})_p$—$X^{PH}$ is ortho to $R^{PH4}$, then $X^{PH}$ and $R^{PH4}$, together, with the atoms to which $X^{PH}$ and $R^{PH4}$ are attached, may form a ring; and
(4) if p is 3-20, then $R^{PH3}$ and $R^{PH4}$ are each, independently H, alkyl, or alkoxy, and X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$,

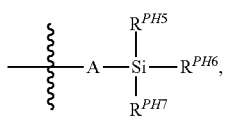

or —NR$^{PHX}$R$^{PHY}$;
wherein A is

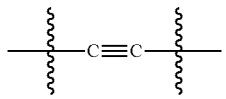 [SMILES: *C#C*]

or a single bond,
R$^{PHX}$ and R$^{PHY}$ are each, independently, H, alkyl, alkenyl, alkynyl, cycloalkyl, aryl, heteroaryl, heterocyclyl, or —C(O)R$^{PHZ}$,
  wherein R$^{PHZ}$ is H, alkyl, alkenyl, alkynyl, cycloalkyl, aryl, heteroaryl, heterocyclyl, —OR$^{PH8}$, or —NR$^{PH10}$R$^{PH11}$;
R$^{PH5}$ to R$^{PH7}$ are each, independently, alkyl, alkenyl, alkynyl, alkaryl, aralkyl, aryl, heteroaryl, alkoxy, hydroxy, NR$^{PH10}$R$^{PH11}$, —F, —Cl, —Br, —I, or —At,
R$^{PH8}$ is alkyl, alkenyl, alkynyl, alkaryl, aryl, or heteroaryl, and R$^{PH9}$ to R$^{PH11}$ are each, independently, H, alkyl, alkenyl, alkynyl, alkaryl, aryl, or heteroaryl.

In some embodiments, the quenching agent is anisole, 3-bromopropoxybenzene, b-chlorophenetole, allyl phenyl ether, isopropyl phenyl ether, 2,6-di-tert-butylphenol, 11-phenoxy-1-undecanol, 6-phenoxy-1-hexanol, 4-phenoxy-1-butanol, tort-butyl(3-phenoxy-1-propynyl)diphenylsilane, 2,3-dihydrobenzofuran, chlorodimethyl(3-phenoxypropyl)silane, or trichloro(3-phenoxypropyl)silane. In some embodiments, the quenching agent provides phenoxy-ether-terminated polyolefins.

In some embodiments, the quenching agent is selected from those disclosed in Stokes, U.S. application Ser. No. 12/355,664, which is incorporated herein by reference in its entirety. Exemplary quenching agents include, but are not limited to compounds having the following formula:

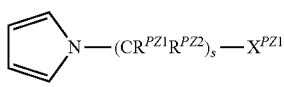

wherein R$^{PZ1}$ and R$^{PZ2}$ are independently in each —(CR$^{PZ1}$R$^{PZ2}$)— unit, hydrogen or alkyl from 1 to 6 carbon atoms;
s is an integer from 2 to 20; and
Z$^{PZ1}$ is —F, —Cl, —Br, —I, —At, —CN, —NC, —N$_3$, —NCO, —OCN, —NCS or —SCN.

In some embodiments, the quenching agent is 1-(2-chloroethyl)pyrrole, 1-(2-bromoethyl)pyrrole, 1-(3-bromopropyl)pyrrole, 1-(2-cyanoethyl)pyrrole, 1-(2-azidoethyl)pyrrole. In some embodiments, the quenching agent provides a N-substituted pyrrole-terminated polyolefin.

In some embodiments, the quenching agent is anisole, 3-phenoxypropyl bromide, isopropoxy benzene, 3,6-di-tert-butylphenol, or n-methylpyrrole.

In some embodiments, the quenching agent is allyltrimethylsilane. See, for example, Wilczek et al., *Polymer Bulletin,* 17: 37-43 (1987), which is incorporated herein by reference in its entirety.

In some embodiments, the quenching agent is methallyltrimethylsilane or isobutenyltrimethylsilane. See for example, Nielsen et al., *Polymer,* 38(10): 2529-2534 (1997), which is incorporated herein by reference in its entirety.

In some embodiments, the quenching agent is a 1,1-diarylethylene. The 1,1-diarylethylene, in some embodiments, is used to initially quench the growing polymer chain to form a diarylcarbenium-ion terminated polymer, which is subsequently reacted with a suitable nucleophile or reactant to form a polymer having a 1-substituted-1,1-diarylethylene end group. The nucleophile, in some embodiments, may be the terminator. In some embodiments, the 1,1-diarylethylene is 1,1-diphenylethylene. 1,1-diarylethylene quenching methodology is described in, for example, Fodor et al. *J.M.S.-Pure Appl. Chem.*, A32(3): 575-591 (1995); Hadjikyriacou et al., *J.M.S.-Pure Appl. Chem.*, A32(6): 1137-1153 (1995); Kamigaito et al., *Macromolecules,* 28: 5671-5675 (1995); Li et al., *Macromolecules,* 28: 1383-1389 (1995); Hadjikyriacou et al., *Macromolecules,* 29: 5261-5267 (1996); Mayr et al., *Macromolecules,* 29: 6110-6113 (1996); and Kwon et al., *Macromolecules,* 35: 3348-3357 (2002), which are incorporated herein by reference in their entireties.

In some embodiments, the quenching agent is 1,3-butadiene. Exemplary methodology employing 1,3-butadiene as a quenching agent is described in Knoll et al., U.S. Pat. No. 5,212,248, De et al., *Macromolecules,* 38:6861-6870 (2006); and De et al., *Macromolecules,* 39: 7527-7533 (2006), which are incorporated herein by reference in their entireties. In some embodiments, 1,3-butadiene is employed as the quenching agent to obtain an allyl-halide terminated polymer.

In some embodiments, the quenching agent is a long chain olefin, including but not limited to those described in Yamanaka et al., U.S. Pat. No. 5,777,037 and Chiba et al., European Patent Application No. 1,225,186, which are incorporated herein by reference in their entireties. In some embodiments, the quenching agent is 1,9-decadiene.

In some embodiments, the quenching agent is an allylsilylpseudohalide, including, but not limited to those described in Shaffer, U.S. Pat. No. 5,580,935, which is incorporated herein by reference in its entirety.

In some embodiments, the quenching agent is a furan or substituted furan, including but not limited to those described in Hadjikyriacou et al., *Macromolecules,* 32(20): 6393-6399 (1999) and Hadjikyriacou et al, *Macromolecules,* 33: 730-733 (2000), the entireties of which are incorporated herein by reference. Examples include, but are not limited to, 2-alkyl furans, such as 2-methyl furan and 2-tert-butyl furan. Other examples include, but are not limited to, bis(furanyl) derivatives such as 2,5-bis(2-furyl-2-propyl)furan.

In some embodiments, the quenching agent is thiophene or a substituted thiophene. See, for example, Martinez-Castro et al., *Macromolecules,* 36: 6985-6994 (2003), the entirety of which is incorporated herein by reference.

In some embodiments, the quenching agent is a triarylamine. An example includes, but is not limited to, triphenylamine. See, for example, Zhang et al., *Journal of Polymer Science: Part A: Polymer Chemistry,* 46: 936-946 (2008).

In some embodiments, the quenching agent is a vinylalkoxybenzene. Examples include, but are not limited to, those described in Japanese Patent Publication No. 05186513A, which is incorporated herein by reference in its entirety.

In some embodiments, quenching is performed for about 5 minutes to about 120 minutes.

(vi) Terminators

Terminators for use in the methods described herein include any compound that is capable of deactivating Lewis acid. Terminators, in some embodiments, decompose a Lewis acid or destroy the Lewis acid character of a compound. In some embodiments, the terminator is a base and/or nucleophile. In some embodiments, the terminator is an organic base. In some embodiments, the terminator is an electron donor. In some embodiments, the terminator does not add to and end cap the growing polymer. In some embodiments, the terminator is an alcohol or amine. In some embodiments, the terminator is a pyridine derivative.

Exemplary terminators include, but are not limited to, methanol, ethanol, isopropanol, or water. In another embodiment, terminators include diethylamine, triethylamine, pyridine, 2,6-lutidine, n-butylamine, or tert-amylamine.

In the methods described herein, one or more terminators may be added at a desired time to deactivate the Lewis acid present in the polymerization reaction. One or more terminators may be added, in some embodiments, after the addition of the quenching agent. For example, in some embodiments, a telechelic polymer is synthesized by contacting a terpene initiator with a Lewis acid in the presence of one or more monomers, then allowing polymerization of the monomer to proceed for a desired time, then adding a quenching agent to functionalize the growing polymer, and then adding a terminator to deactivate the Lewis acid.

In other embodiments, one or more terminators are directly added to the growing polymer to obtain halide-terminated polymer products, which result from the addition of halide ions present in the polymerization reaction with the growing polymer. For example, in some embodiments, a halide terminated-polymer is obtained by contacting a terpene initiator with a Lewis acid in the presence of one or more monomers, then allowing polymerization of the monomer to proceed for a desired time, and then adding a terminator to deactivate the Lewis acid. In some embodiments, the halide-terminated polymer product is a tert-halide terminated polymer product. In some embodiments, the tert-halide terminated polymer product is a tert-chloride terminated polymer product.

(vii) Products

The telechelic polymers that are formed by the methods described herein, in some embodiments, have the following formula:

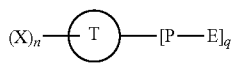

wherein:

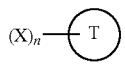

is a terpene initiator residue;
  wherein X is a functional group bonded to a primary or secondary carbon and n is an integer from 1-3;
  P is a divalent polyolefin group;
  E is an end-cap group; and
  q is an integer from 1-5.

In some embodiments, the terpene initiator residue has the structure of the terpene initiator that was employed in the method, wherein the leaving groups of the one or more tertiary carbons containing a leaving group are replaced by [P-E].

In some embodiments, the terpene initiator residue contains 10, 15, or 20 carbons, excluding any carbon contained in $(X)_n$. In some embodiments, the terpene initiator residue contains 10 carbon atoms, excluding any carbon contained in $(X)_n$.

In some embodiments,

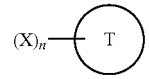

is selected from

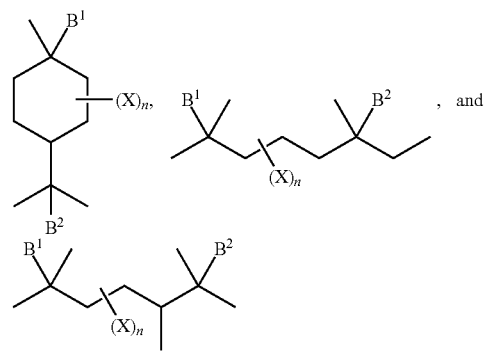

wherein:
$B^1$ and $B^2$, independently at each occurrence, are H or a bond to P.
  wherein at least one of $B^1$ and $B^2$ is a bond to P;
X is —OH, —F, —Cl, —Br, —I, —OC(O)$R^4$, —O$R^4$, —NC, —NCO, —OCN, —SH, —S$R^4$, —S(O)$R^4$, —S(O)$_2R^4$, —SCN, —NO$_2$, —OS(O)$_2R^4$, or =O,
  wherein $R^4$ is alkyl, alkenyl, or alkynyl, and
  X is bonded to a primary or secondary carbon; and
n is an integer from 1-3.

In some embodiments, $R^4$ is alkyl, alkyl of 1-3 carbons, or methyl.

In some embodiments, X is —OH, —F, —Cl, —Br, —I, —OC(O)$R^4$, or —O$R^4$. In some embodiments, X is —OH, —Br, —O$R^4$, or —OC(O)$R^4$. In some embodiments, X is —OH, —Br, —OCH$_3$, or —OC(O)CH$_3$. In some embodiments, X is —OH.

In some embodiments, X is bonded to a primary carbon.

In some embodiments, n is 1-2. In some embodiments, n is 1.

In some embodiments, q is 1-4, 1-3, 1-2, or 1.

In some embodiments, P is

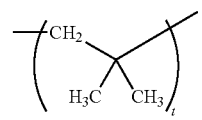

wherein t is an integer from 2-20000. In some embodiments, t is 2-10000. In some embodiments, t is 2-5000. In some embodiments, t is at least 10, 15, 20, or 50.

In some embodiments, t is an integer from 2-7500, 2-5000, 2-2500, 2-1000, or 2-500.

In some embodiments,
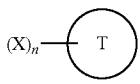
is
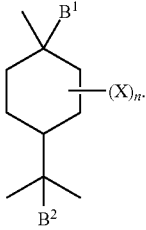
In some embodiments,
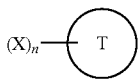
is
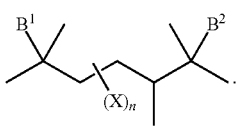
In some embodiments,
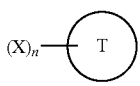
is
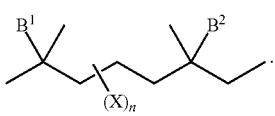
In further embodiments,
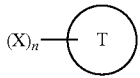
is
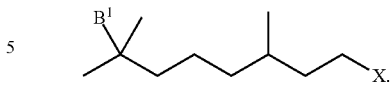
In a particular embodiments,
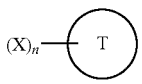
is
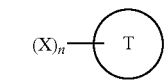
wherein:
X is —OH, —F, —Cl, —Br, —I, —OR$^A$, or —OC(O)R$^A$. In a an even further embodiment, X is —OH, —Br, —OCH$_3$, or —OC(O)CH$_3$. In another embodiment, X is —OH.
In some embodiments,
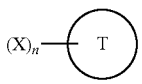
is
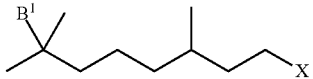
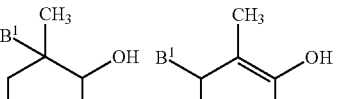
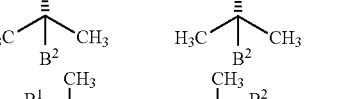
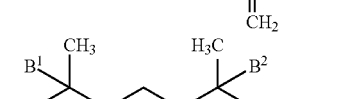 or
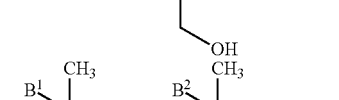
wherein B$^1$ and B$^2$ are each a bond to P.

In some embodiments, the end-cap group may serve as a site of reactivity under suitable reaction conditions, thereby allowing derivatization of the polymer at its terminal end.

In some embodiments, the end-cap group is installed by employing any of the quenching agents described herein or known in the art.

In some embodiments, E is an end-cap group selected from the group consisting of (1)

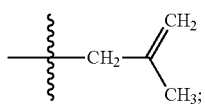

(2)

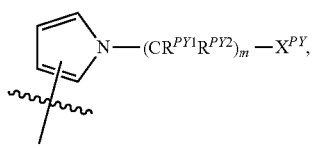

wherein $R^{PY1}$ and $R^{PY2}$ are independently in each —(CR$^{PY1}$R$^{PY2}$)— unit selected from the group consisting of hydrogen and alkyl from 1 to 6 carbon atoms;
m is an integer from 1 to 20; and
$X^{PY}$ is selected from the group consisting of hydrogen, alkyl, aryl, alkaryl, alkoxy, heteroaryl, nitro, ureido, —OC(O)R$^{PY3}$, —C(O)R$^{PY4}$, —C(O)OR$^{PY5}$, —C(O)NR$^{PY6}$R$^{PY7}$, —P(R$^{PY8}$)$_3$, —P(OR$^{PY9}$)$_3$, —SR$^{PY10}$, —OSO$_3$R$^{PY11}$, and —S(O)R$^{PY12}$;
wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl;

(3)

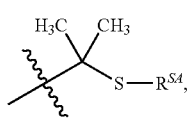

wherein $R^{S4}$ is alkyl, aryl, aralkyl, alkaryl,

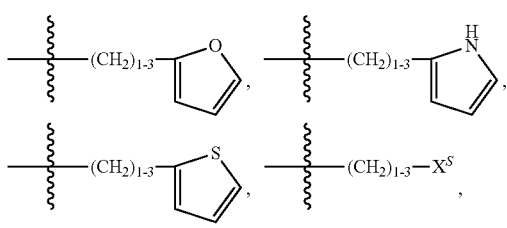

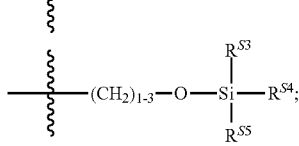

$X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl;

(4)

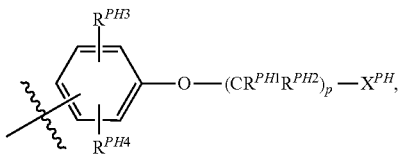

wherein
$R^{PH1}$ and $R^{PH2}$ are each, independently in each —(CR$^{PH1}$R$^{PH2}$) unit, H or alkyl, and p is an integer from 0-20, wherein
(a) if p is 0, then $R^{PH3}$ and $R^{PH4}$ are each, independently, alkyl, and
$X^{PH}$ is H;
(b) if p is 1, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, or

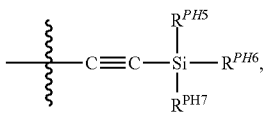

wherein $R^{PH5}$—$R^{PH7}$ are each, independently, alkyl or aryl;
(c) if p is 2, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)R$^{PH8}$, —C(O)OR$^{PH9}$, —C(O)NR$^{PH10}$R$^{PH11}$, or

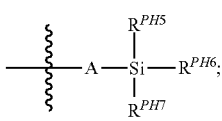

wherein A is

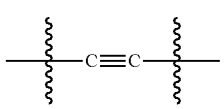 [SMILES: *C#C*]

or a single bond,
$R^{PH5}$ to $R^{PH7}$ are each, independently, alkyl, alkenyl, alkynyl, alkaryl, aralkyl, aryl, heteroaryl, alkoxy, hydroxy, NR$^{PH10}$R$^{PH11}$, —F, —Cl, —Br, —I, or —At,
$R^{PH8}$ is alkyl, alkenyl, alkynyl, alkaryl, aryl, or heteroaryl, and
$R^{PH9}$ to $R^{PH11}$ are each, independently, H, alkyl, alkenyl, alkynyl, alkaryl, aryl, or heteroaryl, or when —O—(CR$^{PH1}$R$^{PH2}$)$_p$—X$^{PH}$ is ortho to R$^{PH4}$, then $X^{PH}$ and $R^{PH4}$, together, with the atoms to which $X^{PH}$ and $R^{PH4}$ are attached, may form a ring; and (d) if p is 3-20, then $R^{PH3}$ and $R^{PH4}$ are each, independently H, alkyl, or alkoxy, and X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$,

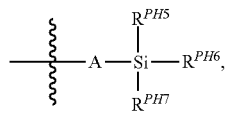

or —NR$^{PHX}$R$^{PHY}$;

wherein A is

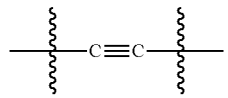

or a single bond,

R$^{PHX}$ and R$^{PHY}$ are each, independently, H, alkyl, alkenyl, alkynyl, cycloalkyl, aryl, heteroaryl, heterocyclyl, C(O)R$^{PHZ}$, wherein R$^{PHZ}$ is H, alkyl, alkenyl, alkynyl, cycloalkyl, aryl, heteroaryl, heterocyclyl, —OR$^{PH8}$, or —NR$^{PH10}$R$^{PH11}$;

R$^{PH5}$ to R$^{PH7}$ are each, independently, alkyl, alkenyl, alkynyl, alkaryl, aralkyl, aryl, heteroaryl, alkoxy, hydroxy, NR$^{PH10}$R$^{PH11}$, —F, —Cl, —Br, —I, or —At, R$^{PH8}$ is alkyl, alkenyl, alkynyl, alkaryl, aryl, or heteroaryl, and R$^{PH9}$ to R$^{PH11}$ are each, independently, H, alkyl, alkenyl, alkynyl, alkaryl, aryl, or heteroaryl; and (5)

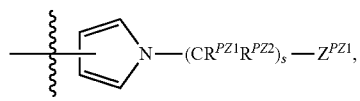

wherein R$^{PZ1}$ and R$^{PZ2}$ are independently in each —(CR$^{PZ1}$R$^{PZ2}$)— unit, hydrogen or alkyl from 1 to 6 carbon atoms;

s is an integer from 2 to 20;

Z$^{PZ1}$ is —F, —Cl, —Br, —I, —At, —CN, —NC, —N$_3$, —NCO, —OCN, —NCS or —SCN.

In some embodiments, the end cap group is

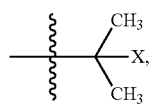

wherein X is a halide. In some embodiments, X is —Cl.

In some embodiments, the end-cap group is

In some embodiments, the end-cap group is a 1-substituted-1,1-diaryl ethylene group. Examples include, but are not limited to, those described in Fodor et al., *J.M.S.-Pure Appl. Chem.*, A32(3): 575-591 (1995); Hadjikyriacou et al., *J.M.S.-Pure Appl. Chem.*, A32(6): 1137-1153 (1995); Kamigaito et al., *Macromolecules*, 28: 5671-5675 (1995); Li et al., *Macromolecules*, 28: 1383-1389 (1995); Hadjikyriacou et al., *Macromolecules*, 29: 5261-5267 (1996); Mayr et al., *Macromolecules*, 29: 6110-6113 (1996); and Kwon et al., *Macromolecules*, 35: 3348-3357 (2002), which are incorporated herein by reference in their entireties.

In some embodiments, the end-cap group is an ally halide, such as, but not limited to, those described in Knoll et al., U.S. Pat. No. 5,212,248, De et al., *Macromolecules*, 38:6861-6870 (2006); and De et al., *Macromolecules*, 39: 7527-7533 (2006).

In some embodiments, the end-cap group is installed by quenching the growing polymer with a long chain olefin, such as those described in Yamanaka et al., U.S. Pat. No. 5,777,037 and Chiba et al., European Patent Application No. 1,225,186, the entireties of which are incorporated herein by reference.

In some embodiments, the end-cap group is installed by quenching the growing chain with an allylsilylpseudohalide, including, but not limited to those described in Shaffer, U.S. Pat. No. 5,580,935, which is incorporated herein by reference in its entirety.

In some embodiments, the end-cap group a furan or substituted furan, including but not limited to those described in Hadjikyriacou et al., *Macromolecules*, 32(20): 6393-6399 (1999) and Hadjikyriacou et al, *Macromolecules*, 33: 730-733 (2000), the entireties of which are incorporated herein by reference. Examples include, but are not limited to, 2-alkyl furans, such as 2-methyl furan and 2-tert-butyl furan. Other examples include, but are not limited to, bis(furanyl) derivatives such as 2,5-bis(2-furyl-2-propyl)furan, which, in some embodiments, provide coupled products as described in Hadjikyriacou et al, *Macromolecules*, 33: 730-733 (2000).

In some embodiments, the end-cap group is a thiophene, including, for example, 2-thiophene, or substituted thiophene.

In some embodiments, the end-cap group is a triarylamine. Example includes, but is not limited to, triphenylamine. In some embodiments, the end-cap group is

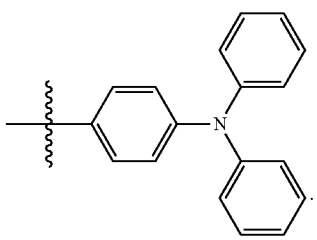 [SMILES: *c1ccc(N(c2ccccc2)c2ccccc2)cc1]

In some embodiments, the end-cap group is a vinylalkoxybenzene. Examples include, but are not limited to, those described in Japanese Patent Publication No. 05186513A, which is incorporated herein by reference in its entirety.

In some embodiments, the polydispersity index of the telechelic polymer product is less than 1.9, less than 1.8, less than 1.7, less than 1.6, less than 1.5, less than 1.4, less than 1.3, less than 1.2, or less than 1.1.

In some embodiments, the molecular weight of the polymer is about 1000, about 2000, about 3000, about 4000, about 5000, about 6000. about 7000, about 8000, about 9000, or about 10000 g/mol.

(viii) Electron Donors

As is understood to one of ordinary skill in the art, some electron donors are capable of converting traditional polymerization systems into quasiliving carbocationic polymerization systems. In some embodiments, the methods described herein are performed in the presence of an electron donor.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N-dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is pyridine or a pyridine derivative. In some embodiments, the electron donor is a compound of formula:

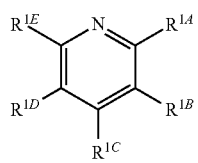

wherein $R^{1A}$, $R^{1B}$, $R^{1C}$, $R^{1D}$, and $R^{1E}$ are each, independently, hydrogen or hydrocarbyl; or $R^{1A}$ and $R^{1B}$, or $R^{1B}$ and $R^{1C}$, or $R^{1C}$ and $R^{1D}$, or $R^{1D}$ and $R^{1E}$ independently form a fused aliphatic ring of about 3 to about 7 carbon atoms or a fused aromatic ring of about 5 to about 7 carbon atoms. In some embodiments, $R^{1A}$ and $R^{1F}$ are each, independently, hydrocarbyl, and $R^{1B}$-$R^{1D}$ are hydrogen.

In some embodiments, the electron donor is 2,6-di-tert-butylpyridine, 2,6-lutidine, 2,4-lutidine, 2,4,6-trimethylpyridine, 2-methylpyridine, or pyridine. In some embodiments, the electron donor is N,N-dimethylaniline or N,N-dimethyltoluidine. In some embodiments, the electron donor is 2,6-lutidine.

(ix) Common Ion Salts and Common Ion Salt Precursors

In some embodiments, common ion salts or salt precursors may be optionally added to the reaction mixture in addition to or in replacement of the electron donor. In some embodiments, such salts may be used to increase the ionic strength, suppress free ions, and interact with ligand exchange. In some embodiments, the common ion salt precursor is tetra-n-butylammonium chloride. In some embodiments, the common ion salt precursor is tetra-n-butylammonium bromide. In some embodiments, the common ion salt precursor is tetra-n-butylammonium iodide. In some embodiments, the concentration of the common ion salts or salt precursors in the total reaction mixture may be in the range from about 0.0005 moles per liter to about 0.05 moles per liter. In some embodiments, the concentration of the common ion salts or salt precursors is in the range from about 0.0005 moles per liter to about 0.025 moles per liter. In some embodiments, the concentration of the common ion salt or salt precursors is in the range from about 0.001 moles per liter to about 0.007 moles per liter.

(x) Diluents

In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane. In some embodiments, the diluent is a normal alkane. In some embodiments, the diluent is propane, normal butane, normal pentane, normal hexane, normal heptane, normal octane, normal nonane or normal decane. In some embodiments, the diluent is normal hexane or normal pentane. In some embodiments, the diluent is normal hexane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the alkane is cyclic. In some embodiments, the alkane is methylcyclohexane. In some embodiments, the diluent is a mixed boiling fraction alkane. In some embodiments, the diluent is a mixed boiling fraction of C5 alkanes, i.e., mixed pentanes or mixed boiling fraction of C6 alkanes, i.e., mixed hexanes. In some embodiments, the alkane is a nitroalkane.

In some embodiments, the diluent is an alkyl halide. In some embodiments, the diluent is an alkyl monohalide or an alkyl polyhalide. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, isopropyl chloride, 1,2-dichloropropane, or 1,3-dichloropropane. In some embodiments, the diluent is methylene chloride or methyl chloride. In some embodiments, the diluent is methyl chloride. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene. In some embodiments, the diluent is benzene. In some embodiments, the diluent is toluene.

In some embodiments, the diluent is carbon disulfide, sulfur dioxide, acetic anhydride, acetonitrile, benzene, toluene, ethylbenzene, methylcyclohexane, chlorobenzene, or a nitroalkane.

In some embodiments, the diluent is a mixture of two or more compounds. In some embodiments, the diluent is a mixture of hexane and methyl chloride. In further embodiments, such mixture is from about 10/90 to about 90/10 hexane/methyl chloride by volume. In further embodiments, such mixture is from about 20/80 to about 80/20 hexane/ methyl chloride by volume. In further embodiments, such mixture is from about 30/70 to about 70/30 hexane/methyl chloride by volume. In further embodiments, such mixture is from about 40/60 to about 60/40 hexane/methyl chloride by volume. In further embodiments, such mixture is about 50/50 hexane/methyl chloride by volume. In further embodiments, such mixture is about 60/40 hexane/methyl chloride by volume. In further embodiments, such mixture is about 40/60 hexane/methyl chloride by volume.

(xi) Temperature

In some embodiments, the methods provided herein are performed at a temperature from about −120° C. to about 0° C. In some embodiments, the temperature is from about −110° C. to about −10° C. In some embodiments, the temperature is from about −100° C. to about −20° C. In some embodiments, the temperature is about −75° C., about −70° C., about −65° C., about −60° C., about −55° C., about −50° C., about −45° C., about −40° C., about −35° C., about −30° C., about −25° C., about −20° C., about −15° C., about −10° C., about −5° C., or about 0° C.

(xii) Quasiliving Polymerization

In some embodiments, the polymerization reactions described herein are performed under quasiliving polymerization conditions. Such polymerization conditions are known to those of ordinary skill in the art and proceed with minimal irreversible chain termination and minimal chain transfer. In such polymerizations, initiation is followed by propagation, wherein propagating (active) species are in equilibrium with non-propagating (dormant) polymer chains. In some embodiments, reaction systems suitable to carry out quasiliving polymerizations include one or more Lewis acids, monomers, initiators, and electron donors. In some embodiments, the reaction system comprises a common ion salt or common ion salt precursor. In some embodiments, the reaction system comprises a diluent.

(c) Compositions of Matter

Provided herein are compounds having the following formula:

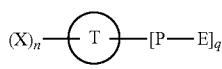

wherein:

is a terpene moiety;
X is a functional group and bonded to primary or secondary carbon;
P is a divalent polyolefin group;
E is an end-cap group;
q is an integer from 1-5; and
and n is an integer from 1-3.
In some embodiments,

contains 10, 15, or 20 carbons. In some embodiments,

contains 10 carbons.

In some embodiments,

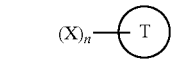

is selected from

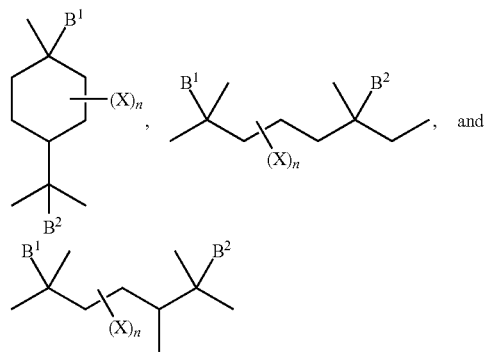

wherein:
$B^1$ and $B^2$, independently at each occurrence, are H or a bond to P,
wherein at least one of $B^1$ and $B^2$ is a bond to P;
X is —OH, —F, —Cl, —Br, —I, —OC(O)$R^A$, —O$R^A$, —NC, —NCO, —OCN, —SH, —S$R^A$, —S(O)$R^A$, —S(O)$_2R^A$, —SCN, —NO$_2$, —OS(O)$_2R^A$, or =O, wherein
$R^A$ is alkyl, alkenyl, or alkynyl, and
X is bonded to a primary or secondary carbon; and
n is an integer from 1-3.

In some embodiments, $R^A$ is alkyl, alkyl of 1-3 carbons, or methyl.

In some embodiments, X is —OH, —F, —Cl, —Br, —I, —OC(O)$R^A$, or —O$R^A$. In some embodiments, X is —OH, —Br, —O$R^A$, or —OC(O)$R^A$. In some embodiments, X is —OH, —Br, —OCH$_3$, or —OC(O)CH$_3$. In some embodiments, X is —OH.

In some embodiments, n is 1-2. In some embodiments, n is 1.

In some embodiments, q is 1-4, 1-3, 1-2, or 1.
In some embodiments, P is

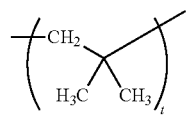

wherein t is an integer from 2-20000. In some embodiments, t is 2-10000. In some embodiments, t is 2-5000. In some embodiments, t is at least 10, 15, 20, or 50.

In some embodiments, t is an integer from 2-7500, 2-5000, 2-2500, 2-1000, or 2-500.

In some embodiments,
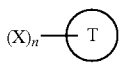
is
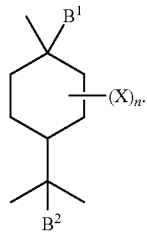
In some embodiments,
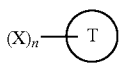
is
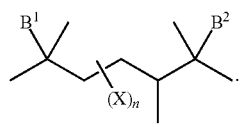
In some embodiments,
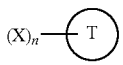
is
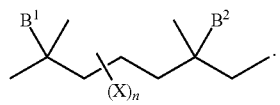
In further embodiments,
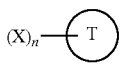
is
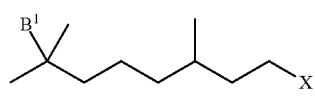
wherein $B^1$ is a bond to P.
In a particular embodiments,
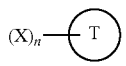
is
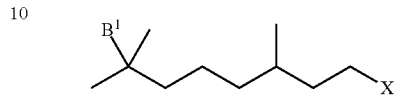
wherein:
X is —OH, —F, —Cl, —Br, —I, —OR$^A$, or —OC(O)R$^A$. In a an even further embodiments, X is —OH, —Br, —OCH$_3$, or —OC(O)CH$_3$. In another embodiment, X is —OH.
In some embodiments,
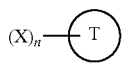
is
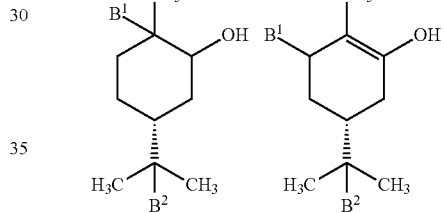
or
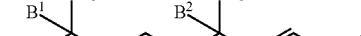
wherein $B^1$ and $B^2$ are each a bond to P.

The end cap group, as used herein, refers to a monovalent molecule that can react at a desired time with another molecule. In some embodiments, E is an end-cap group selected from the group consisting of (1)

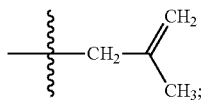

(2)

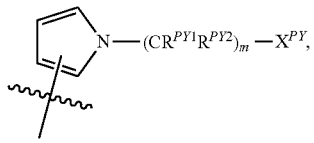

wherein $R^{PY1}$ and $R^{PY2}$ are independently in each —$(CR^{PY1}R^{PY2})$— unit selected from the group consisting of hydrogen and alkyl from 1 to 6 carbon atoms; m is an integer from 1 to 20; and
$X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)N$R^{PY6}R^{PY7}$, —P($R^{PY8}$)$_3$, —P(O$R^{PY9}$)$_3$, —S$R^{PY10}$, —OSO$_3R^{PY11}$, and —S(O)$R^{PY12}$.
wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are alkyl;

(3)

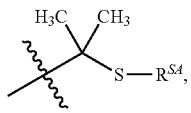

wherein $R^{S4}$ is alkyl, aryl, aralkyl, alkaryl,

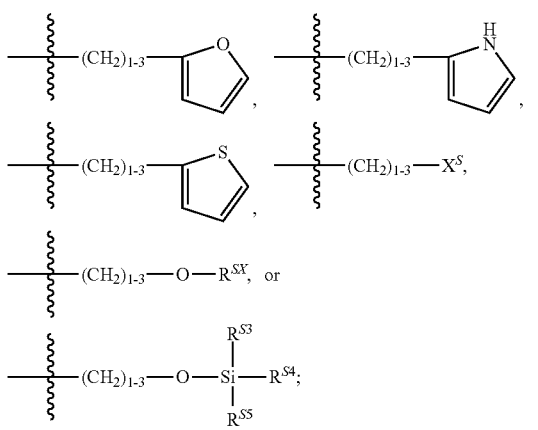

$X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl (4)

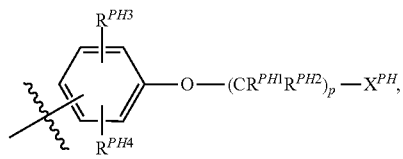

wherein
$R^{PH1}$ and $R^{PH2}$ are each, independently in each —$(CR^{PH1}R^{PH2})$ unit, H or alkyl, and p is an integer from 0-20, wherein
(a) if p is 0, then $R^{PH3}$ and $R^{PH4}$ are each, independently, alkyl, and $X^{PH}$ is H;
(b) if p is 1, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, or

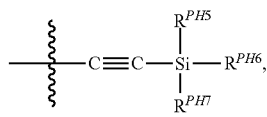

wherein $R^{PH5}$—$R^{PH7}$ are each, independently, alkyl or aryl;
(c) if p is 2, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

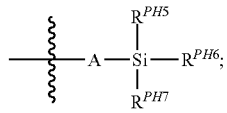

wherein A is

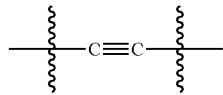 [SMILES: *C#C*]

or a single bond,
$R^{PH5}$ to $R^{PH7}$ are each, independently, alkyl, alkenyl, alkynyl, alkaryl, aralkyl, aryl, heteroaryl, alkoxy, hydroxy, N$R^{PH10}R^{PH11}$, —F, —Cl, —Br, —I, or —At,
$R^{PH8}$ is alkyl, alkenyl, alkynyl, alkaryl, aryl, or heteroaryl, and
$R^{PH9}$ to $R^{PH11}$ are each, independently, H, alkyl, alkenyl, alkynyl, alkaryl, aryl, or heteroaryl, or when —O—$(CR^{PH1}R^{PH2})_p$—$X^{PH}$ is ortho to $R^{PH4}$, then $X^{PH}$ and $R^{PH4}$, together, with the atoms to which $X^{PH}$ and $R^{PH4}$ are attached, may form a ring; and
(d) if p is 3-20, then $R^{PH3}$ and $R^{PH4}$ are each, independently H, alkyl, or alkoxy, and X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)R$^{PH8}$, —C(O)OR$^{PH9}$, —C(O)NR$^{PH10}$R$^{PH11}$,

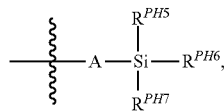

or —NR$^{PHX}$R$^{PHY}$;
wherein A is

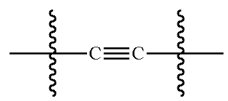

or a single bond,
R$^{PHX}$ and R$^{PHY}$ are each, independently, H, alkyl, alkenyl, alkynyl, cycloalkyl, aryl, heteroaryl, heterocyclyl, C(O)R$^{PHZ}$,
   wherein R$^{PHZ}$ is H, alkyl, alkenyl, alkynyl, cycloalkyl, aryl, heteroaryl, heterocyclyl, —OR$^{PH8}$, or
R$^{PH5}$ to R$^{PH7}$ are each, independently, alkyl, alkenyl, alkynyl, alkaryl, aralkyl, aryl, heteroaryl, alkoxy, hydroxy, NR$^{PH10}$R$^{PH11}$, —F, —Cl, —Br, —I, or —At,
R$^{PH8}$ is alkyl, alkenyl, alkynyl, alkaryl, aryl, or heteroaryl, and R$^{PH9}$ to R$^{PH11}$ are each, independently, H, alkyl, alkenyl, alkynyl, alkaryl, aryl, or heteroaryl; and (5)

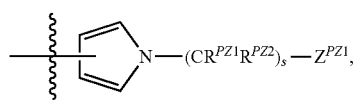

wherein R$^{PZ1}$ and R$^{PZ2}$ are independently in each —(CR$^{PZ1}$R$^{PZ2}$)— unit, hydrogen or alkyl from 1 to 6 carbon atoms;
   s is an integer from 2 to 20;
   Z$^{PZ1}$ is —F, —Cl, —Br, —I, —At, —CN, —NC, —N$_3$, —NCO, —OCN, —NCS or —SCN.
In some embodiments, the end cap group is

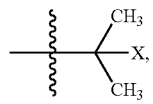

wherein X is a halide. In some embodiments, X is —Cl.
In some embodiments, the end-cap group is

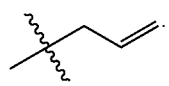

In some embodiments, the end-cap group is a 1-substituted-1,1-diaryl ethylene group. Examples include, but are not limited to, those described in Fodor et al., *J.M.S.-Pure Appl. Chem.*, A32(3): 575-591 (1995); Hadjikyriacou et al., *J.M.S.-Pure Appl. Chem.*, A32(6): 1137-1153 (1995); Kamigaito et al. *Macromolecules*, 28: 5671-5675 (1995); Li et al., *Macromolecules*, 28: 1383-1389 (1995); Hadjikyriacou et al., *Macromolecules*, 29: 5261-5267 (1996); Mayr et al., *Macromolecules*, 29: 6110-6113 (1996); and Kwon et al., *Macromolecules*, 35: 3348-3357 (2002), which are incorporated herein by reference in their entireties.

In some embodiments, the end-cap group is an allyl halide, such as, but not limited to, those described in Knoll et al., U.S. Pat. No. 5,212,248, De et al., *Macromolecules*, 38:6861-6870 (2006); and De et al., *Macromolecules*, 39: 7527-7533 (2006), the entireties of which are incorporated by reference.

In some embodiments, the end-cap group is derived from a long chain olefin quenching agent, such as those described in Yamanaka et al., U.S. Pat. No. 5,777,037 and Chiba et al., European Patent Application No. 1,225,186, the entireties of which are incorporated by reference.

In some embodiments, the end-cap group is derived from an allylsilylpseudohalide, quenching agent, including, but not limited to those described in Shaffer, U.S. Pat. No. 5,580,935, which is incorporated herein by reference in its entirety. In some embodiments, the end-cap group a furan or substituted furan, including but not limited to those described in Hadjikyriacou et al., *Macromolecules*, 32(20): 6393-6399 (1999) and Hadjikyriacou et al, *Macromolecules*, 33: 730-733 (2000), the entireties of which are incorporated herein by reference. Examples include, but are not limited to, 2-alkyl furans, such as 2-methyl furan and 2-tert-butyl furan. Other examples include, but are not limited to, bis(furanyl) end cap groups such as 2,5-bis(2-furyl-2-propyl)furan. Also provided herein are compounds wherein a single bis(furanyl) end cap group is bonded to two P moieties, which are obtainable through a coupling reaction described in Hadjikyriacou et al, *Macromolecules*, 33: 730-733 (2000), rather than one P moiety as depicted above.

In some embodiments, the end-cap group is thiophene, including, for example, 2-thiophene, or substituted thiophene.

In some embodiments, the end-cap group is a triarylamine. Example includes, but is not limited to, triphenylamine. In some embodiments, the end-cap group is

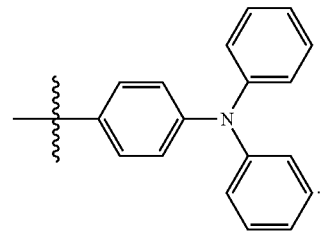 [SMILES: *c1ccc(N(c2ccccc2)c2ccccc2)cc1]

In some embodiments, the end-cap group is a vinylalkoxybenzene. Examples include, but are not limited to, those described in Japanese Patent Publication No. 05186513A, which is incorporated herein by reference in its entirety.

In some embodiments, the polydispersity index of the compound is less than 1.9, less than 1.8, less than 1.7, less than 1.6, less than 1.5, less than 1.4, less than 1.3, less than 1.2, or less than 1.1.

In some embodiments, the molecular weight of the compound is about 1000, about 2000, about 3000, about 4000, about 5000, about 6000, about 7000, about 8000, about 9000, about 10000, about 20000, about 30000, about 40000, about 50000, about 60000, about 70000, about 80000, about 90000, or about 100000 g/mol.

5. EXAMPLES

(a) Example 1

Example 1 was carried out in a dry $N_2$ atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. 7-chloro-3,7-dimethyloctan-1-ol initiator (2.171 g, 0.0385M), 2,6-Lutidine (1.46 mL, 0.0435M), 1 aliquot of isobutylene (4.00 mL, 0.165M) and 290 mL of prechilled 40:60 v:v hexane/methyl chloride solvent mixture was added to the flask and allowed to thermally equilibrate for ~1 hour. The polymerization was initiated upon addition of $TiCl_4$ (4.50 mL, 0.142M). The polymerization was monitored by observing decrease in isobutylene monomer concentration via ReactIR. Once most of the isobutylene had been consumed, a second aliquot of monomer (4.00 mL, 0.165M) was added until approximately the same monomer conversion level was reached. This was repeated 9 times for a total monomer charge of 36.4 mL (1.5M). After the final aliquot of monomer had been consumed, the polymerization was quenched with anisole (1.81 g, 0.058M). An additional charge of $TiCl_4$ (3.06 mL, 0.096M) was then added to increase the rate of electrophillic aromatic substitution by anisole. The quenching was allowed to proceed for approximately 90 min, then the reaction was terminated with 15.5 mL of prechilled methanol. The flask was removed immediately from the bath and allowed to warm to ambient temperature overnight, at which point the methyl chloride solvent had boiled off. The reaction mixture was then washed with a 90:10 v:v methanol/water mixture, followed by dilute HCl, saturated sodium bicarbonate solution, and finally deionized water. The organic layer was dried over $MgSO_4$, filtered, and the solvent was removed by rotary evaporation.

The recovered polymer was analyzed via 1H NMR and size-exclusion GPC. The measured molecular weight of the polymer was ~2700 g/mol with a polydispersity index of 1.26.

The 7-chloro-3,7-dimethyloctan-1-ol starting material employed as initiator above was obtained via hydrochlorination of β-citronellol with gaseous HCl.

(b) Example 2

A polymerization was conducted under conditions similar to those described above in Example 1, except 3 phenoxypropyl bromide was used as the quenching agent. 1H NMR confirmed quantitative capping of the polymer.

(c) Example 3

A polymerization was conducted under conditions similar to those described above in Example 1, except isopropoxy benzene was used as the quenching agent. 1H NMR confirmed quantitative capping of the polymer.

(d) Example 4

A polymerization was conducted under conditions similar to those described above in Example 1, except 2,6-di-tert-butylphenol was used as the quenching agent. 1H NMR confirmed quantitative capping of the polymer.

(e) Example 5

A polymerization was conducted under conditions similar to those described above in Example 1, except N-methylpyrrole was used as the quenching agent. 1H NMR confirmed quantitative capping of the polymer.

(f) Example 6

Example 6 was carried out in a dry $N_2$ atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. Then, 7-chloro-1-methoxy-3,7-dimethyloctane initiator (2.303 g. 0.0385M), 2,6-Lutidine (0.34 mL. 0.01M), 1 aliquot of isobutylene (4.00 mL, 0.165M) and 290 mL of prechilled 40:60 v:v hexane/methyl chloride solvent mixture was added to the flask and allowed to thermally equilibrate for ~1 hour. The polymerization was initiated upon addition of $TiCl_4$ (4.62 mL, 0.145M). The polymerization was monitored by observing decrease in isobutylene monomer concentration via ReactIR. Once most of the isobutylene had been consumed, a second aliquot of monomer (4.00 mL, 0.165M) was added until approximately the same monomer conversion level was reached. This was repeated 9 times for a total monomer charge of 36.4 mL (1.5M). After the final aliquot of monomer had been consumed, the polymerization was quenched with anisole (1.81 g, 0.058M). An additional charge of $TiCl_4$ (1.49 mL, 0.047M) was then added to increase the rate of electrophilic aromatic substitution by anisole. The quenching was allowed to proceed for approximately 45 min, then the reaction was terminated with 13.5 mL of prechilled methanol. The flask was removed immediately from the bath and allowed to warm to ambient temperature overnight, at which point the methyl chloride solvent had boiled off. The reaction mixture was then washed with a 90:10 v:v methanol/water mixture, followed by dilute HCl, saturated sodium bicarbonate solution, and finally deionized water. The organic layer was dried over $MgSO_4$, filtered, and the solvent was removed by rotary evaporation.

The recovered polymer was analyzed via 1H NMR and size-exclusion GPC. The measured molecular weight of the polymer was ~2300 g/mol with a polydispersity index of 1.56.

The 7-chloro-1-methoxy-3,7-dimethyloctane starting material was obtained by reacting β-citronellol with methyl iodide and potassium hydroxide under anhydrous conditions. The methylated product was then hydrochlorinated using gaseous HCl.

(g) Example 7

Example 7 was carried out in a dry $N_2$ atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. Then, 7-chloro-3,7-dimethyloctyl acetate initiator (3.314 g, 0.0429M), 2,6-Lutidine (1.77 mL, 0.0529M), 1 aliquot of isobutylene (4.00 mL, 0.165M) and 290 mL of prechilled 40:60 v:v hexane/methyl chloride solvent mixture was added to the flask and allowed to thermally equilibrate for ~1 hour. The polymerization was initiated upon addition of $TiCl_4$ (5.50 mL, 0.173M). The polymerization was monitored by observing the decrease in isobutylene monomer concentration via ReactIR. Once most of the isobutylene had been consumed, a second aliquot of monomer (4.00 mL, 0.165M) was added until approximately the same monomer conversion level was reached. This was repeated 9 times for a total monomer charge of 36.4 mL (1.5M). After the final aliquot of monomer had been consumed, the polymerization was quenched with anisole (2.02 g, 0.064M). An additional charge of TiCl$_4$ (3.00 mL, 0.094M) was then added to increase the rate of electrophilic aromatic substitution by anisole. The quenching was allowed to proceed for approximately 65 min, then the reaction was terminated with 18.8 mL of prechilled methanol. The flask was removed immediately from the bath and allowed to warm to ambient temperature overnight, at which point the methyl chloride solvent had boiled off. The reaction mixture was then washed with a 90:10 v:v methanol/water mixture, followed by dilute HCl, saturated sodium bicarbonate solution, and finally deionized water. The organic layer was dried over MgSO$_4$, filtered, and the solvent was removed by rotary evaporation.

The recovered polymer was analyzed via 1H NMR and size-exclusion GPC. The measured molecular weight of the polymer was ~3900 g/mol with a polydispersity index of 1.42.

The 7-chloro-3,7-dimethyl-octyl acetate starting material was synthesized by reacting B-citronellol with acetic anhydride and pyridine, followed by hydrochlorination.

(h) Example 8

Example 8 was carried out in a dry N$_2$ atmosphere glovebox equipped with an externally chilled hexane/heptane bath. A 4-neck 500 mL round-bottom flask was placed in the bath at −45° C. and equipped with an overhead stirrer, thermocouple, and a ReactIR probe. Then, 1-bromo-7-chloro-3,7-dimethyl octane initiator (3.09 g, 0.0417M), 2,6-Lutidine (0.34 mL, 0.01M), 1 aliquot of isobutylene (4.00 mL, 0.165M) and 290 mL of prechilled 60:40 v:v hexane/methyl chloride solvent mixture was added to the flask and allowed to thermally equilibrate for ~1 hour. The polymerization was initiated upon addition of TiCl$_4$ (6.15 mL, 0.193M). The polymerization was monitored by observing the decrease in isobutylene monomer concentration via ReactIR. Once most of the isobutylene had been consumed, a second aliquot of monomer (4.00 mL, 0.165M) was added until approximately the same monomer conversion level was reached. This was repeated 9 times for a total monomer charge of 36.4 mL (1.5M). After the final aliquot of monomer had been consumed, the polymerization was quenched with anisole (1.96 g, 0.063M). An additional charge of TiCl$_4$ (1.00 mL, 0.031M) was then added to increase the rate of electrophilic aromatic substitution by anisole. The quenching was allowed to proceed for approximately 60 min, then the reaction was terminated with 14.7 mL of prechilled methanol. The flask was removed immediately from the bath and allowed to warm to ambient temperature overnight, at which point the methyl chloride solvent had boiled off. The reaction mixture was then washed with a 90:10 v:v methanol/water mixture, followed by dilute HCl, saturated sodium bicarbonate solution, and finally deionized water. The organic layer was dried over MgSO$_4$, filtered, and the solvent was removed by rotary evaporation.

The recovered polymer was analyzed via 1H NMR and size-exclusion GPC. The measured molecular weight of the polymer was ~4200 g/mol with a polydispersity index of 1.32.

The 1-bromo-7-chloro-3,7-dimethyl octane starting material was obtained via hydrochlorination of citronellyl bromide.

It is understood that the detailed description and accompanying examples are merely illustrative and are not to be taken as limitations upon the scope of the subject matter. Various changes and modifications to the disclosed embodiments will be apparent to those skilled in the art. Such changes and modifications, including without limitation those relating to the chemical structures, substituents, derivatives, intermediates, synthesis, starting materials, products, and/or reaction conditions may be made without departing from the spirit and scope of thereof. Included within the scope of the subject matter described herein are all combinations of the embodiments described herein. All U.S. patents, patent applications, and patent publications referenced herein are incorporated herein by reference in their entireties.

What is claimed:

1. A method for producing a telechelic polyolefin, comprising contacting a terpene initiator with a Lewis acid in the presence of one or more monomers;

wherein the terpene initiator contains (a) one or more tertiary carbons containing a leaving group, and (b) one or more functional groups, wherein the one or more functional groups are bonded to a primary or secondary carbon and are unmodified under polymerization conditions; and wherein the terpene initiator is selected from:

(a)

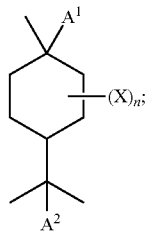

wherein:
A$^1$ and A$^2$ are each independently a leaving group or H, wherein at least one of A$^1$ and A$^2$ is a leaving group;
each X is independently (i) —OH, wherein X is bonded to a primary or secondary carbon; or (ii) —F, —Cl, —Br, —I, =O, —OC(O)R$^A$, —OR$^A$, —NC, —NCO, —OCN, —SH, —SR$^A$, —S(O)R$^A$, —S(O)$_2$R$^A$, —SCN, —NO$_2$, or —OS(O)$_2$R$^A$, wherein each R$^A$ is independently alkyl, alkenyl, or alkenyl, and X is bonded to a primary carbon; and
each n is independently an integer from 1-3;

(b)

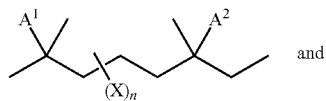 and

-continued

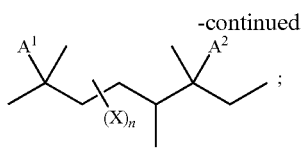

wherein:
  each $A^1$ and $A^2$ is independently a leaving group or H, wherein at least one of $A^1$ and $A^2$ is a leaving group;
  each X is independently —OH, —F, —Cl, —Br, —I, =O, —OC(O)$R^A$, —O$R^A$, —NC, —NCO, —OCN, —SH, —S$R^A$, —S(O)$R^A$, —S(O)$_2R^A$, —SCN, —NO$_2$, or —OS(O)$_2R^A$, wherein each $R^A$ is independently alkyl, alkenyl, or alkynyl, and X is bonded to a primary or secondary carbon; and
  each n is independently an integer from 1-3;
and
(c)

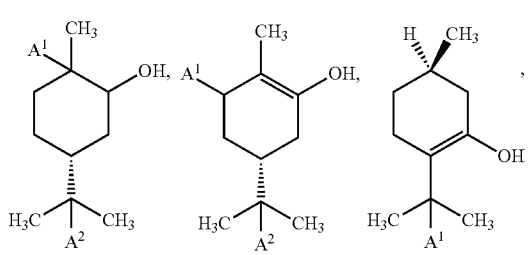

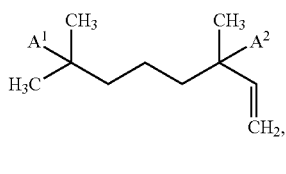

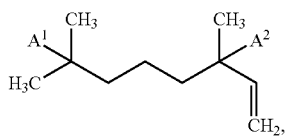

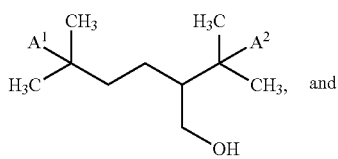

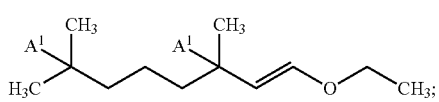

wherein each $A^1$ and $A^2$ is independently —Cl, —Br, or —I.

2. The method of claim 1, wherein the terpene initiator is selected from:

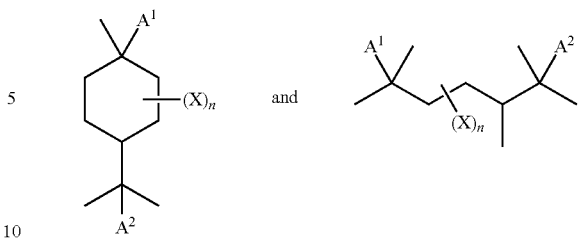

3. The method of claim 1, wherein the telechelic polymer produced has the following formula:

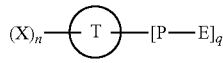

wherein:

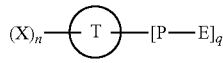

is selected from:

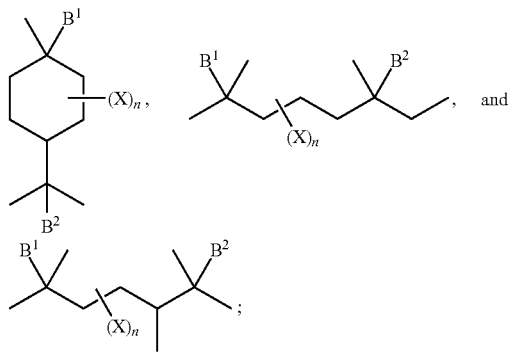

wherein:
  $B^1$ and $B^2$, independently at each occurrence, are H or a bond to P, wherein at least one of $B^1$ and $B^2$ is a bond to P;
  each X is independently (i) —OH, wherein X is bonded to a primary or secondary carbon; or (ii) —F, —Cl, —Br, —I, =O, —OC(O)$R^A$, —O$R^A$, —NC, —NCO, —OCN, —SH, —S$R^A$, —S(O)$R^A$, —S(O)$_2R^A$, —SCN, —NO$_2$, or —OS(O)$_2R^A$, wherein each $R^A$ is independently alkyl, alkenyl, or alkynyl, and X is bonded to a primary carbon;
  each n is independently an integer from 1-3;
  each P is independently a divalent polyolefin group;
  each E is independently an end-cap group; and
  q is an integer from 1-2.

4. The method of claim 1, wherein X is —OH, —O$R^A$, —OC(O)$R^A$, —F, —Cl, or —Br, wherein $R^A$ is, independently at each occurrence, alkyl of 1-3 carbons.

5. The method of claim 1, wherein X is —OH.

6. The method of claim 1, wherein the leaving group is, independently at each occurrence, —Cl, —Br, —I, or —OC(O)$R^N$, wherein $R^N$ is alkyl having 1 to 6 carbons.

7. The method of claim 1, wherein n is 1.

8. The method of claim 1, wherein at least one of $A^1$ and $A^2$ is H.

9. The method of claim 1, wherein X is bonded to a primary carbon.

10. The method of claim 1, wherein the terpene initiator is:

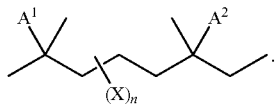

11. The method of claim 10, wherein the terpene initiator is:

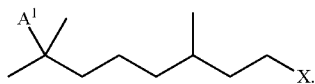

12. The method of claim 10, wherein the terpene initiator is:

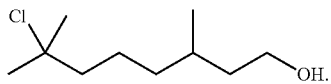

13. The method of claim 1, wherein the terpene initiator is:

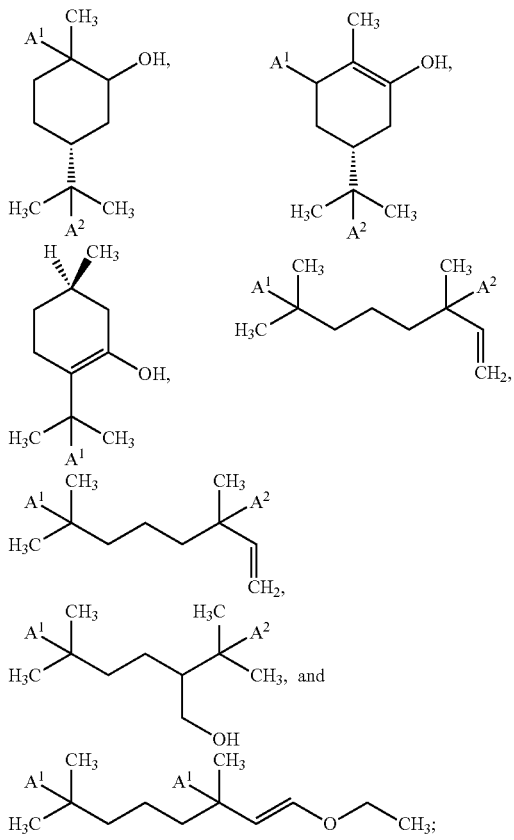

wherein each $A^1$ and $A^2$ is independently —Cl, —Br, or —I.

14. The method of claim 1, wherein the terpene initiator contains 10 carbon atoms, excluding any carbon atoms that are a part of the one or more leaving groups or one or more functional groups.

15. The method of claim 1, further comprising adding one or more quenching agents.

16. The method of claim 15, wherein the quenching agent is:

(a) allyltrimethylsilane;
(b) methallyltrimethylsilane;
(c) 1,1-diphenylethylene;
(d) furan or a substituted furan;
(e) thiophene or a substituted thiophene;
(f) triphenylamine;
(g) a compound having the following formula:

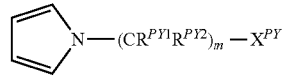

wherein:
$R^{PY1}$ and $R^{PY2}$ are each independently in each —$(CR^{PY1}R^{PY2})$— unit selected from the group consisting of hydrogen and alkyl of 1 to 6 carbon atoms;

m is an integer from 1 to 20; and $X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)OR$^{PY5}$, —C(O)NR$^{PY6}$R$^{PY7}$, —P(R$^{PY8}$)$_3$, —P(OR$^{PY9}$)$_3$, —SR$^{PY10}$, —OSO$_3$R$^{PY11}$, and —S(O)R$^{PY12}$;

wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are each independently alkyl;

(h) a compound having the following formula:

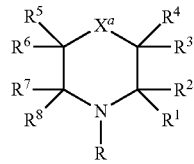

wherein:
$R^1$ through $R^8$ are each independently hydrogen, alkyl from 1 to 20 carbon atoms, aryl from 6 to about 20 carbon atoms, alkaryl from about 7 to 30 carbon atoms, or aralkyl from about 7 to 30 carbon atoms;

R is hydrogen, alkyl from 1 to 20 carbon atoms, aryl from 6 to about 20 carbon atoms, alkaryl from about 7 to 30 carbon atoms, or aralkyl from about 7 to 30 carbon atoms; and $X^a$ is oxygen or sulfur;

with the proviso that when R is hydrogen or methyl, then $R^1$, $R^2$, $R^7$ and $R^8$ must be other than hydrogen unless one of $R^1$ and $R^2$ and one of $R^7$ and $R^8$ are each independently branched alkyl of about 3 to 20 carbon atoms, aryl, alkaryl or aralkyl;

(i) a compound having the following formula:

$$R^1—S—R^2$$

wherein $R^1$ and $R^2$, are each, independently, hydrocarbyl;
(j) a compound having the following formula:

$$R^{SA}S—S—R^{SB}$$

wherein $R^{SA}$ and $R^{SB}$ are each, independently, alkyl, aryl, aralkyl, alkaryl,

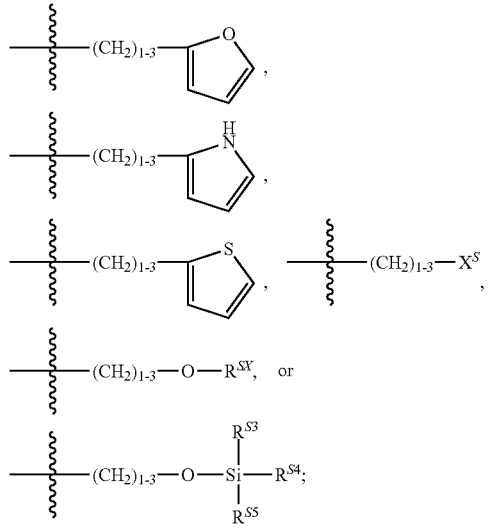

wherein:
- $X^S$ is halo or a pseudohalide;
- $R^{SX}$ is alkyl or aryl;
- $R^{S3}$ is tert-butyl; and
- $R^{S4}$ and $R^{S5}$ are each, independently, alkyl, aryl, aralkyl, or alkaryl;

(k) a compound having the following formula:

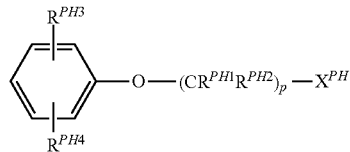

wherein:
$R^{PH1}$ and $R^{PH2}$ are each, independently in each —$(CR^{PH1}R^{PH2})$— unit, H or alkyl, and p is an integer from 0-20, wherein:
(1) if p is 0, then $R^{PH3}$ and $R^{PH4}$ are each, independently, alkyl, and $X^{PH}$ is H;
(2) if p is 1, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, or

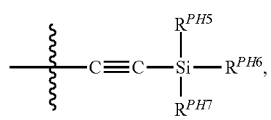

wherein $R^{PH5}$—$R^{PH7}$ are each, independently, alkyl or aryl;
(3) if p is 2, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

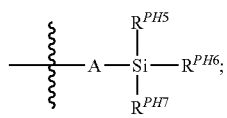

wherein A is

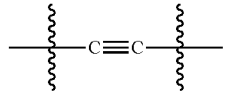 [SMILES: *C#C*]

or a single bond, $R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each, independently, H, alkyl, alkenyl, alkynyl, aryl, or heteroaryl, or when —O—$(CR^{PH1}R^{PH2})_p$—$X^{PH}$ is ortho to $R^{PH4}$, then $X^{PH}$ and $R^{PH4}$, together, with the atoms to which $X^{PH}$ and $R^{PH4}$ are attached, form a ring; and
(4) if p is 3-20, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$,

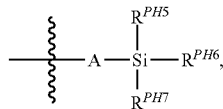

or —N$R^{PHX}R^{PHY}$; wherein A is

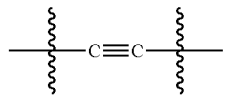

or a single bond, $R^{PHX}$ and $R^{PHY}$ are each, independently, H, alkyl, alkenyl, alkynyl, cycloalkyl, aryl, heteroaryl, heterocyclyl, or —C(O)$R^{PHZ}$, wherein $R^{PHZ}$ is H, alkyl, alkenyl, alkynyl, cycloalkyl, aryl, heteroaryl, heterocyclyl, —O$R^{PH8}$, or —N$R^{PH10}R^{PH11}$; $R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each independently, H, alkyl, alkenyl, alkynyl, alkaryl, aryl, or heteroaryl;

Or (l) butadiene.

17. The method of claim 3, wherein the end-cap group is:

(a)

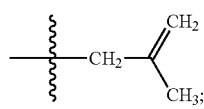

(b)

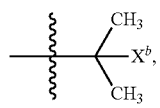

wherein $X^b$ is a halide;

(C)

(d) a 1-substituted-1,1-diaryl ethylene group;

(e) furyl or a substituted furyl;

(f) thienyl or a substituted thienyl;

(g) triphenylamino;

(h)

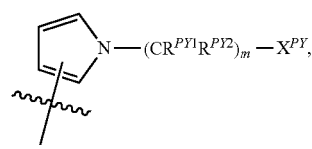

wherein:

$R^{PY1}$ and $R^{PY2}$ are independently in each —$(CR^{PY1}R^{PY2})$— unit selected from the group consisting of hydrogen and alkyl from 1 to 6 carbon atoms;

m is an integer from 1 to 20; and $X^{PY}$ is selected from the group consisting of hydrogen, alkyl, aryl, alkaryl, alkoxy, heteroaryl, nitro, ureido, —OC(O)$R^{PY3}$, —C(O)$R^{PY4}$, —C(O)O$R^{PY5}$, —C(O)N$R^{PY6}R^{PY7}$, —P($R^{PY8}$)$_3$, —P(O$R^{PY9}$)$_3$, —S$R^{PY10}$, —OSO$_3R^{PY11}$, and —S(O)$R^{PY12}$; wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are each independently alkyl;

(i)

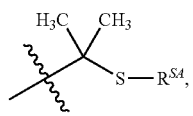

wherein $R^{SA}$ is alkyl, aryl, aralkyl, alkaryl,

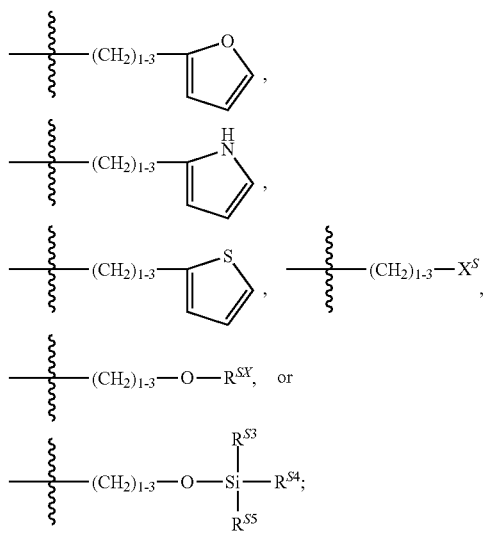

wherein:

$X^S$ is halo or a pseudohalide;
$R^{SX}$ is alkyl or aryl;
$R^{S3}$ is tert-butyl; and
$R^{S4}$ and $R^{S5}$ are each, independently, alkyl, aryl, aralkyl, or alkaryl;

(j)

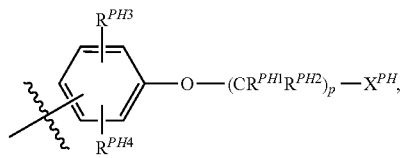

wherein:

$R^{PH1}$ and $R^{PH2}$ are each, independently in each —$(CR^{PH1}R^{PH2})$— unit, H or alkyl, and p is an integer from 0-20, wherein:

(1) if p is 0, then $R^{PH3}$ and $R^{PH4}$ are each, independently, alkyl, and $X^{PH}$ is H;

(2) if p is 1, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, or

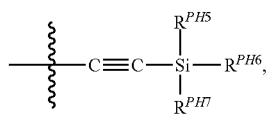

wherein $R^{PH5}$—$R^{PH7}$ are each, independently, alkyl or aryl;

(3) if p is 2, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

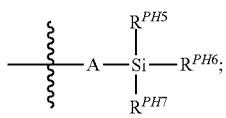

wherein A is

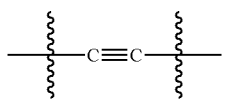 [SMILES: *C#C*]

or a single bond, $R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$, —F, —Cl, —Br, —I, or —At, $R^{PH8}$ is alkyl, alkenyl, alkynyl, alkaryl, aryl, or heteroaryl, and $R^{PH9}$ to $R^{PH11}$ are each, independently, H, alkyl, alkenyl, alkynyl, alkaryl, aryl, or heteroaryl, or when —O—(C$R^{PH1}R^{PH2}$)$_p$—$X^{PH}$ is ortho to $R^{PH4}$, then $X^{PH}$ and $R^{PH4}$, together, with the atoms to which $X^{PH}$ and $R^{PH4}$ are attached, form a ring; and (4) if p is 3-20, then $R^{PH3}$ and $R^{PH4}$ are each, independently H, alkyl, or alkoxy, and X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^{PH8}$, —C(O) O$R^{PH9}$, —C(O)N$R^{PH10}R^{PH11}$,

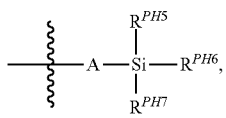

or —N$R^{PHX}R^{PHY}$; wherein A is

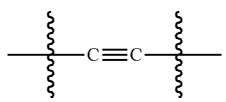

or a single bond, $R^{PHX}$ and $R^{PHY}$ are each, independently, H, alkyl, alkenyl, alkynyl, cycloalkyl, aryl, heteroaryl, heterocyclyl, C(O)$R^{PHZ}$, wherein $R^{PHZ}$ is H, alkyl, alkenyl, alkynyl, cycloalkyl, aryl, heteroaryl, heterocyclyl, —O$R^{PH8}$, or —N$R^{PH10}R^{PH11}$; $R^{PH5}$ to $R^{PH7}$ are each, independently, alkyl, alkenyl, alkynyl, alkaryl, aralkyl, aryl, heteroaryl, alkoxy, hydroxy, —N$R^{PH10}R^{PH11}$; —F, —Cl, —Br, —I, or —At, $R^{PH8}$ is alkyl, alkenyl, alkynyl, alkaryl, aryl, or heteroaryl, and $R^{PH9}$ to $R^{PH11}$ each, independently, H, alkyl, alkenyl, alkynyl, alkaryl, aryl, or heteroaryl;

Or (k) a halo-allyl group.

18. The method of claim 3, wherein P is

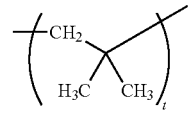

wherein t is an integer from 2-20,000.

19. The method of claim 1, wherein the one or more monomers is isobutene.

20. The method of claim 1, wherein the one or more monomers is styrene.

21. The method of claim 1, wherein the Lewis acid is a titanium halide, an aluminum halide, a boron halide, or an alkyl aluminum halide.

22. The method of claim 1, wherein the Lewis acid is TiCl$_4$.

23. The method of claim 1, wherein the method is performed in the presence of one or more electron donors.

24. The method of claim 23, wherein the one or more electron donors is:

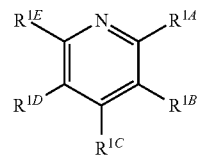

wherein $R^{1A}$, $R^{1B}$, $R^{1C}$, $R^{1D}$, and $R^{1E}$ are each, independently, hydrogen or hydrocarbyl; or $R^{1A}$ and $R^{1B}$, or $R^{1B}$ and $R^{1C}$, or $R^{1C}$ and $R^{1D}$, or $R^{1D}$ and $R^{1E}$ independently form a fused aliphatic ring of about 3 to about 7 carbon atoms or a fused aromatic ring of about 5 to about 7 carbon atoms.

25. The method of claim 24, wherein the one or more electron donors is 2,6-dimethylpyridine, 2,6-di-tert-butylpyridine, 2,4-dimethylpyridine, 2,4,6-trimethylpyridine, 2-methylpyridine, or pyridine.

26. The method of claim 1, wherein the method is performed in the presence of a common ion salt or common ion salt precursor.

27. The method of claim 26, wherein the common ion salt precursor is tetra-n-butylammonium chloride, tetra-n-butylammonium bromide, or tetra-n-butylammonium iodide.

28. The method of claim 15, wherein greater than 90% of the monomer is consumed prior to adding the one or more quenching agents.

29. The method of claim 15, wherein one or more aliquots of additional monomer are added to the polymerization after the initial monomer charge, wherein each individual aliquot of additional monomer is consumed or partially consumed prior to adding a subsequent aliquot of additional monomer or adding the one or more quenching agents.

30. The method of claim 1, wherein the Lewis acid is deactivated with one or more terminators.

31. The method of claim 15, wherein the Lewis acid is deactivated with one or more terminators after adding the one or more quenching agents.

32. The method of claim 3, wherein the Lewis acid is deactivated with one or more terminators and E is a tert-halide.

33. The method of claim 1, wherein the telechelic polyolefin has a polydispersity index of less than 1.9.

34. The method of claim 1, wherein the monomer is polymerized under quasiliving polymerization conditions.

35. The method of claim 1, wherein the terpene initiator is derived by hydrohalogenation of a unsaturated terpene.

36. A method for producing a telechelic polyolefin, comprising contacting a terpene initiator with a Lewis acid in the presence of one or more monomers; wherein the terpene initiator contains (a) one or more tertiary carbons containing a leaving group, and (b) one or more functional groups, wherein the one or more functional groups are bonded to a primary or secondary carbon and are unmodified under polymerization conditions; and wherein the terpene initiator is derived from a compound selected from:

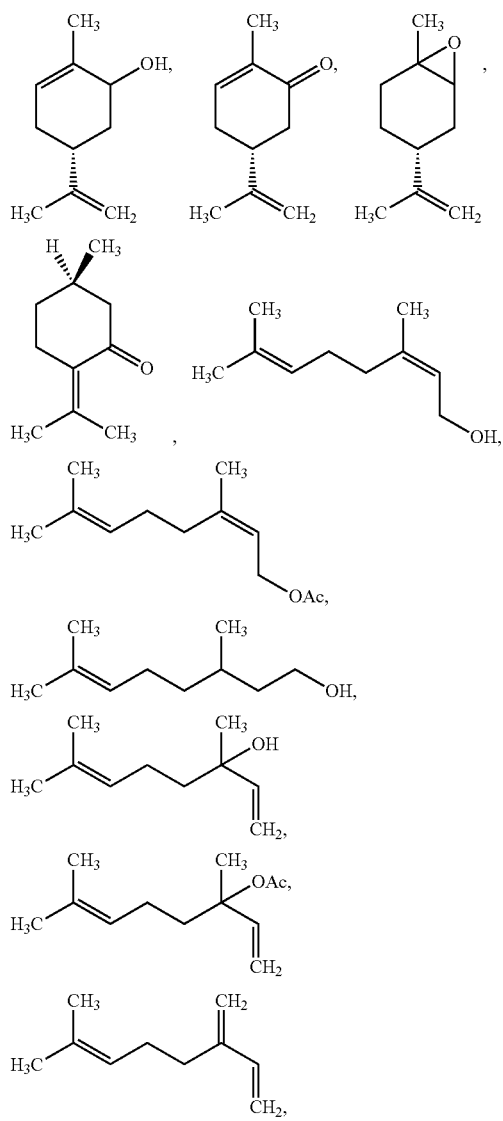

-continued

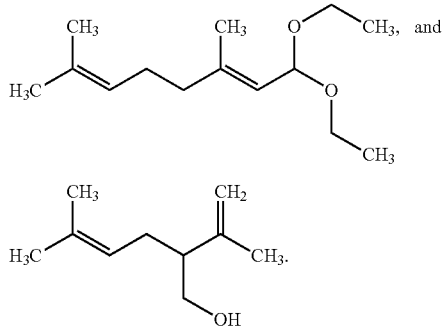

37. The method of claim 36, wherein the terpene initiator is derived from:

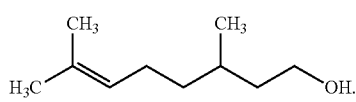

38. A compound having the following formula:

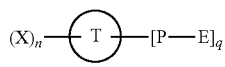

wherein:

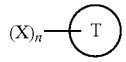

is selected from:

(a)

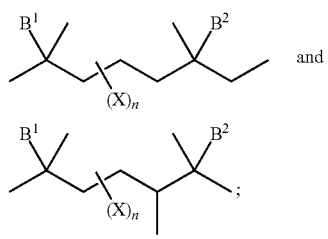

wherein:
B¹ and B², independently at each occurrence, are H or a bond to P, wherein at least one of B¹ and B² is a bond to P;

each X is independently —OH, —F, —Cl, —Br, —I, —NC, —NCO, —OCN, —SH, —SR$^A$, —S(O)R$^A$, —S(O)$_2$R$^A$, —SCN, —OR$^A$, —NO$_2$, —OS(O)$_2$R$^A$, =O, or —OC(O)R$^A$, wherein each R$^A$ is independently alkyl, alkenyl, or alkynyl, and X is bonded to a primary or secondary carbon;

each n is independently an integer from 1-3;

and
(b)

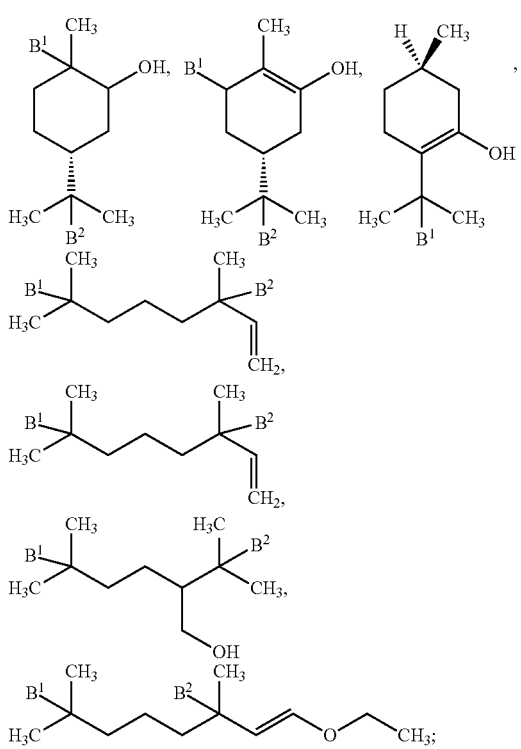

wherein each $B^1$ and $B^2$ is independently H or a bond to P; and at least one of $B^1$ and $B^2$ is a bond to P;
each P is independently a divalent polyolefin group;
each E is independently an end-cap group; and
q is an integer from 1-2.

39. The compound of claim 38, wherein X is —OH, —OR$^A$, —OC(O)R$^A$, —F, —Cl, or —Br, wherein R$^A$ is, independently at each occurrence, alkyl of 1-3 carbons.

40. The compound of claim 38, wherein n is 1.

41. The compound of claim 38, wherein X is bonded to a primary carbon.

42. The compound of claim 38, wherein

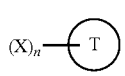

is:

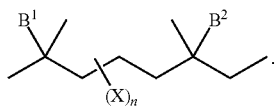

43. The compound of claim 38, wherein

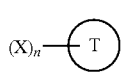

is:

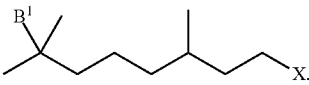

44. The compound of claim 38, wherein

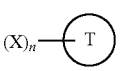

is

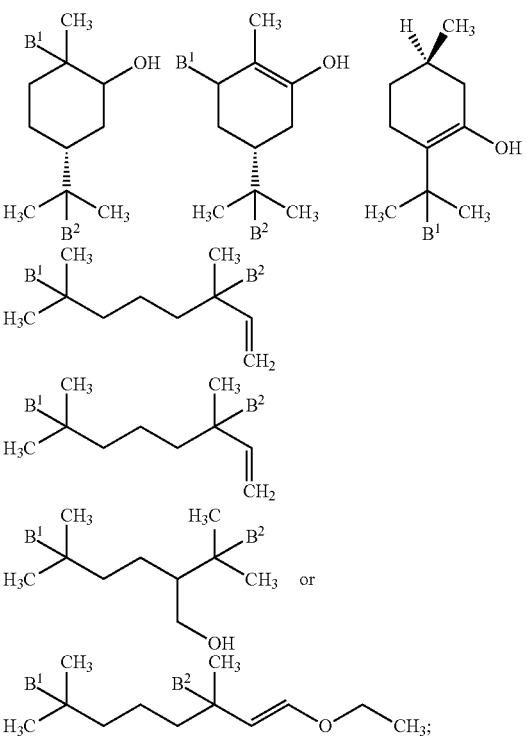

wherein $B^1$ and $B^2$ are each independently H or a bond to P; and at least one of $B^1$ and $B^2$ is a bond to P.

45. The compound of claim 38, wherein the end-cap group is:
(a)

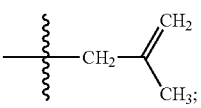

(b)

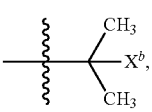

wherein $X^b$ is a halide;

(c)

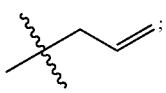 [SMILES: *CC=C]

(d) a 1-substituted-1,1-diaryl ethylene group;
(e) furyl or a substituted furyl;
(f) thienyl or a substituted thienyl;
(g) triphenylamino;
(h)

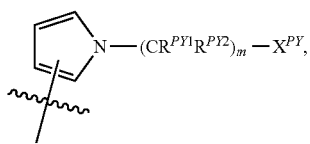

wherein:
- $R^{PY1}$ and $R^{PY2}$ are independently in each $-(CR^{PY1}R^{PY2})-$ unit selected from the group consisting of hydrogen and alkyl from 1 to 6 carbon atoms;
- m is an integer from 1 to 20; and
- $X^{PY}$ is selected from the group consisting of hydrogen, alkyl, aryl, alkaryl, alkoxy, heteroaryl, nitro, ureido, $-OC(O)R^{PY3}$, $-C(O)R^{PY4}$, $-C(O)OR^{PY5}$, $-C(O)NR^{PY6}R^{PY7}$, $-P(R^{PY8})_3$, $-P(OR^{PY9})_3$, $-SR^{PY10}$, $-OSO_3R^{PY11}$, and $-S(O)R^{PY12}$; wherein $R^{PY3}$ is alkyl or alkenyl; and $R^{PY4}$, $R^{PY5}$, $R^{PY7}$, $R^{PY8}$, $R^{PY9}$, $R^{PY10}$, $R^{PY11}$, and $R^{PY12}$ are each independently alkyl;

(i)

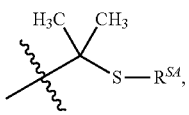

wherein $R^{SA}$ is alkyl, aryl, aralkyl, alkaryl,

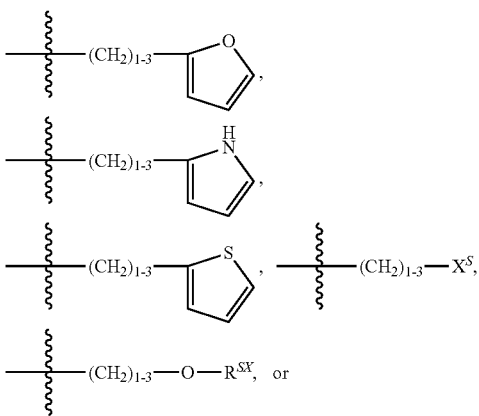

-continued

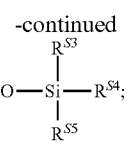

wherein:
- $X^S$ is halo or a pseudohalide;
- $R^{SX}$ is alkyl or aryl;
- $R^{S3}$ is tert-butyl; and
- $R^{S4}$ and $R^{S5}$ are each, independently, alkyl, aryl, aralkyl, or alkaryl;

(j)

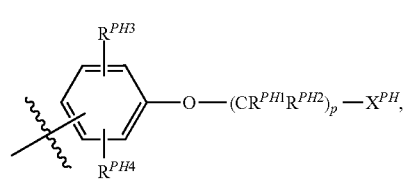

wherein:
- $R^{PH1}$ and $R^{PH2}$ are each, independently in each $-(CR^{PH1}R^{PH2})-$ unit, H or alkyl, and p is an integer from 0-20, wherein:
  (1) if p is 0, then $R^{PH3}$ and $R^{PH4}$ are each, independently, alkyl, and $X^{PH}$ is H;
  (2) if p is 1, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, or

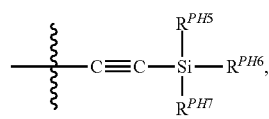

wherein $R^{PH5}-R^{PH7}$ are each, independently, alkyl or aryl;

(3) if p is 2, then $R^{PH3}$ and $R^{PH4}$ are each, independently H, alkyl, or alkoxy, and $X^{PH}$ is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^{PH8}$, —C(O)O$R^{PH9}$, —C(O)N$R^{PH10}R^{PH11}$, or

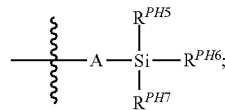

wherein A is

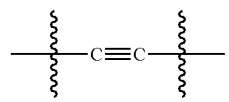 [SMILES: *C#C*]

or a single bond, $R^{PH5}$ to $R^{PH7}$ are each, independently, alkyl, alkenyl, alkynyl, alkaryl, aralkyl, aryl, heteroaryl, alkoxy, hydroxy, —NR$^{PH10}$R$^{PH11}$, —F, —Cl, —Br, —I, or —At, R$^{PH8}$ is alkyl, alkenyl, alkynyl, alkaryl, aryl, or heteroaryl, and R$^{PH9}$ to R$^{PH11}$ are each, independently, H, alkyl, alkenyl, alkynyl, alkaryl, aryl, or heteroaryl, or when —O—(CR$^{PH1}$R$^{PH2}$)$_p$—X$^{PH}$ is ortho to R$^{PH4}$, then X$^{PH}$ and R$^{PH4}$, together, with the atoms to which X$^{PH}$ and R$^{PH4}$ are attached, form a ring; and (4) if p is 3-20, then R$^{PH3}$ and R$^{PH4}$ are each, independently H, alkyl, or alkoxy, and X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)R$^{PH8}$, —C(O)OR$^{PH9}$, —C(O)NR$^{PH10}$R$^{PH11}$,

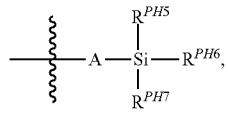

or —NR$^{PHX}$R$^{PHY}$; wherein A is

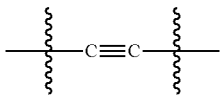 [SMILES: *C#C*]

or a single bond, R$^{PHX}$ and R$^{PHY}$ are each, independently, H, alkyl, alkenyl, alkynyl, cycloalkyl, aryl, heteroaryl, heterocyclyl, C(O)R$^{PHZ}$, wherein R$^{PHZ}$ is H, alkyl, alkenyl, alkynyl, cycloalkyl, aryl, heteroaryl, heterocyclyl, —OR$^{PH8}$, or —NR$^{PH10}$R$^{PH11}$; R$^{PH5}$ to R$^{PH7}$ are each, independently, alkyl, alkenyl, alkynyl, alkaryl, aralkyl, aryl, heteroaryl, alkoxy, hydroxy, —NR$^{PH10}$R$^{PH11}$, —F, —Cl, —Br, —I, or —At, R$^{PH8}$ is alkyl, alkenyl, alkynyl, alkaryl, aryl, or heteroaryl, and R$^{PH9}$ to R$^{PH11}$ are each, independently, H, alkyl, alkenyl, alkynyl, alkaryl, aryl, or heteroaryl;

or (k) a halo-allyl group.

46. The compound of claim 38, wherein P is

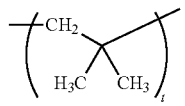

wherein t is an integer from 2-20000.

47. The compound of claim 38, wherein the compound has a polydispersity index of less than 1.9.

* * * * *